United States Patent
Sung

(10) Patent No.: US 7,908,462 B2
(45) Date of Patent: Mar. 15, 2011

(54) VIRTUAL WORLD SIMULATION SYSTEMS AND METHODS UTILIZING PARALLEL COPROCESSORS, AND COMPUTER PROGRAM PRODUCTS THEREOF

(75) Inventor: Mu Chi Sung, Taipei (TW)

(73) Assignee: Zillians Incorporated, Taipei County (TW)

( * ) Notice: Subject to any disclaimer, the term of this patent is extended or adjusted under 35 U.S.C. 154(b) by 0 days.

(21) Appl. No.: 12/797,416

(22) Filed: Jun. 9, 2010

(65) Prior Publication Data
US 2010/0312995 A1 Dec. 9, 2010

Related U.S. Application Data

(60) Provisional application No. 61/185,291, filed on Jun. 9, 2009.

(51) Int. Cl.
G06F 15/76 (2006.01)
(52) U.S. Cl. .............. 712/28; 712/34; 712/16; 345/503; 345/505; 463/2; 463/42
(58) Field of Classification Search ................... None
See application file for complete search history.

(56) References Cited

U.S. PATENT DOCUMENTS

| | | | |
|---|---|---|---|
| 5,307,485 A * | 4/1994 | Bordonaro et al. ............... 1/1 |
| 6,388,667 B1 * | 5/2002 | Sato et al. ..................... 345/473 |
| 6,556,950 B1 * | 4/2003 | Schwenke et al. ............ 702/183 |
| 6,862,027 B2 | 3/2005 | Andrews et al. |
| 7,537,523 B2 * | 5/2009 | Zhang et al. ..................... 463/42 |
| 2003/0177187 A1 * | 9/2003 | Levine et al. ................. 709/205 |
| 2008/0133652 A1 * | 6/2008 | Richards ..................... 709/203 |
| 2009/0141034 A1 | 6/2009 | Pryor et al. |
| 2009/0198604 A1 * | 8/2009 | Jung et al. ..................... 705/35 |
| 2009/0284537 A1 | 11/2009 | Hong et al. |
| 2010/0031164 A1 * | 2/2010 | Dolbier et al. ................. 715/753 |
| 2010/0082654 A1 | 4/2010 | Zhang et al. |
| 2010/0146128 A1 * | 6/2010 | Kulkarni et al. .............. 709/228 |
| 2010/0169799 A1 * | 7/2010 | Hyndman et al. ............. 715/757 |
| 2010/0235608 A1 * | 9/2010 | Armoni et al. ................... 712/17 |

OTHER PUBLICATIONS

"Peer-to-peer support for massively multiplayer games" Knutsson, B.; Honghui Lu; Wei Xu; Hopkins, B.; INFOCOM 2004. Twenty-third AnnualJoint Conference of the IEEE Computer and Communications Societies Issue Date: Mar. 7-11, 2004.*
"A dynamic load sharing algorithm for massively multiplayer online games" Ta Nguyen Binh Duong; Suiping Zhou; Networks, 2003. ICON2003. The 11th IEEE International Conference on Issue Date: Sep. 28-Oct. 1, 2003.*
Leite et al. "Massively Parallel Nearest Neighbor Queries for Dynamic Point Clouds on the GPU", Federal University of Pernambuco, Computer Science Center, Virtual Reality and Multimedia Research Group, Recife, Brazil, IEEE Xplore, 2009.
Philip Rosedale et al. "Enabling Player-Created Online Worlds with Grid Computing and Streaming"; Gamasutra, Sep. 18, 2003.
Alin Moldoveanu et al. "More scalability at lower costs—Server Architecture for Massive Multiplayer 3D Virtual Spaces powered by GPGPU"; International Journal Of Computers And Communications, Issue 4, vol. 1, 2007.

* cited by examiner

*Primary Examiner* — Eddie P Chan
*Assistant Examiner* — Idriss N Alrobaye
(74) *Attorney, Agent, or Firm* — WPAT, PC; Justin King

(57) ABSTRACT

The current invention provides a virtual world simulation system capable of hosting with massive amount of concurrent players by integrating commodity parallel co-processors into servers. The current invention proposes novel parallel processing algorithms to make use of commodity parallel co-processors like a graphic processing unit (GPU) or any specialized hardware with parallel architecture design like a field-programmable gate array (FPGA), to accelerate virtual world simulation.

11 Claims, 15 Drawing Sheets

VIRTUAL WORLD SIMULATION SYSTEMS AND METHODS UTILIZING PARALLEL COPROCESSORS, AND COMPUTER PROGRAM PRODUCTS THEREOF

CROSS REFERENCE TO RELATED PATENT APPLICATION

This patent application benefits from the U.S. Provisional Application 61/185,291 filed on Jun. 9, 2009.

FIELD OF THE INVENTION

The present invention relates to a virtual world simulation system and the method to simulate the virtual world, and more particularly, to a virtual world simulation system utilizing a graphic processor to implement the simulation.

BACKGROUND OF THE INVENTION

MMOG (Massively Multiplayer Online Game) could be the biggest revolution in computer game industry in recent years. As network technology evolved rapidly, thousands or millions of people can login into the same virtual world, stand at the same position, and play the same game together just like they are virtually in the same room at the same place. This has been such a great success since Korea became the world's largest exporter of online games in the year of 2002, and it is now a billion-dollar scale global market expecting to continue its impressive growth.

However, due to challenges in the areas of technology, asset-creation, and marketing, the current conventional practice takes at least two to three years and $20 million USD to build a MMOG. To build an enterprise-level network infrastructure that can scale to millions of simultaneous users would be a daunting task for almost any game developer. The requirement of the scalability is basically outside of the game developer's area of interest and expertise. As a result, numbers of middleware solutions for game developers to ease the development cost for MMOG has shown up since 2004. Several open-source projects have been created to provide free solution. It seems like they all try to answer to the question about MMOG scalability and flexibility and to claim the significantly benefit that hide the complexities of server through the provided platforms.

Virtual world simulation system has been studied and developed in the past few years. There are U.S. patents been issued in this field. A U.S. Pat. No. 6,219,045, entitled "Scalable Virtual World Chat Client-Server System", is issued to Leahy on Apr. 17, 2001. A U.S. Pat. No. 6,731,314, entitled "Network-Based Three-Dimensional Multiple-User Shared Environment Apparatus and Method", is issued to Cheng on May 4, 2004. Another U.S. Pat. No. 7,181,690, entitled "System and Method for Enabling Users to Interact in a Virtual Space", is issued to Leahy on Feb. 20, 2007.

As the real-world game designs are so complicated that make a great impact on server performances, the average number of concurrent online players falls in the range between 2000 and 9000 per server cluster, which is consist of 5 to 20 servers (so each server is only capable of 500~1000 players). For such limitation, most virtual game worlds are replicated into several independent worlds (called shards), in which players cannot communicate with each other due to the geographical constraint. To address the shard problem, recently the Project Darkstar initiated by Sun Microsystems announced their new technology to build "shardless" MMOGs. However, the number of concurrent players per server is still low and therefore the cost while the entire server cluster remains high. Also, their shardless technology is based on dynamic allocation on pre-defined fixed game region, which limits the provisioning efficiency due to the synchronization overhead of those mirror servers.

Designing a reusable, flexible, easy-to-use MMOG platform is challenging. Despite of the usability, the performance metrics are also significant, such as the scalability of MMOG. Scalability is usually the key to operating cost, because the higher scalability the platform is, the lower machine needed to be deployed, which results in lower cost. Even with the modernist design of MMOG platform, like EVE Online, the maximum number of concurrent players ever recorded is 22020. Other than that, as mentioned above, most of each server cluster ranges from 2000 to 9000. As far as we are concern, this is a relatively poor record compared to other internet service such as web server.

To see why, we need to know that the design constraints of MMOG platforms are unique, that is, tens of thousands or millions of players log in the same virtual world to interact with each other, and results in an aggressive amount of commands and updates generated as players move and attack. Therefore, the server cluster needs to process all the commands and sends all the updates to players within a limited time constraint. Lots of researchers put their eye on reducing the network latency to give more time to serve requests. The proposed communication architectures include peer-to-peer architecture and the scalable server/proxy architecture. They all succeed to reduce the network latency to have more concurrent players within acceptable time delay; however the maximum concurrent players is still far from 10 k, which is the capability that a scalable server should have generally. There should be some other bottleneck in the design.

In our point of view, since the network technology evolved rapidly that the optical interconnection is popping out of the surface and the broadband internet access is becoming the majority, the transmission delay between the server and the client has dropped to a certain level. Eventually, the network latency will not be an issue in the near future, and we will spend the most of processing time for client commands.

Basically, due to the current CPU architecture, CPU is not capable of large amount of data, which is most likely the case of MMOG. Due to the differences of the logic gate architecture between the graphic processor and the CPU, a graphic processor provides a much higher performance in parallel processing multiple tasks. CPU architecture emphasizes more on the internal logic gate, which means for handling a more complicated task. On another hand, the graphic processor's architecture emphasizes more on the I/O efficiency, which is not suitable for any complicated task, but does provide a higher performance in handing multiple simple tasks in parallel. Although multi-core CPU has come to market, the memory bandwidth between CPU and main memory is still low, and multiple cache-misses occurred for the sake of limited resources and different execution contexts of the game logics and network handlers. Also, different thread executions need synchronization and atomic locking operation to avoid update conflicts. Apparently, these constraints damage the performance and limit the throughput of executing client commands on CPU.

As we identify the kernel of the problem is due to the architecture of CPU, we began to search for methods to efficiently process significant amount the client commands and update the entire virtual world. Our final answer is GPU. For last decade, GPU has been transformed from a simple 3D rendering acceleration silicon into an array of SIMD (Single Instruction Multiple Data) processors. The parallel computation power of GPU is more than 100 times than CPU, and also, the memory bandwidth between the processor and the device memory of GPU is much larger than that of CPU. In general, GPU has been specialized for both compute-intensive and highly parallel computation, and the computation power of GPU has been grown rapidly even beyond Moore's Law. From the year of 2003, some researcher began to make use of GPU to do general purpose computation by mapping the general purpose problems into a 3D rendering problems. These problems range from collision detection to online databases. In all of the studies, the performance boost by 10 to 100 times is observed by exploiting GPU computation.

In fact, using a graphic processor in server-side is not new. For instance, Simutronics Corporation has integrated the NVIDIA® PhysX® technology, which uses NVIDIA® graphic processor unit (GPU) to accelerate soft-body physics simulation, into their MMO middleware product. However, the use of graphic processor to accelerate virtual world simulation was limited to a small set of simulation tasks. There hasn't been any commercial practice using commodity parallel co-processors like GPUs to accelerate the general logic in virtual world simulation due to the lack of proper algorithm and software support. The most possible reason for that is the complicated calculation and update conflict problem in the MMOG platform. But with the latest GPU technology, the current invention provides a system and a method to migrate the computation load from CPU to GPU.

Hence, the current invention provides the solution for the scalability problem in most of the commercial off-the-shelf MMOG platforms as well as the open source ones; and the current invention proposes a solution by employing the graphic processors. The current invention can really scale up to a very large number of concurrent players on a single server.

SUMMARY OF THE INVENTION

The current invention provides a set of algorithms to process most of client commands or requests in a virtual world by on these graphic processors instead of traditional CPU to accelerate the virtual world simulation. The current invention's approach effectively addresses and alleviates the performance bottleneck of most virtual world simulation which, for example, includes player movement, player attack, neighborhood updates.

Due to the differences of the logic gate architecture between the graphic processor and the CPU, a graphic processor provides a much higher performance in parallel processing multiple tasks. CPU architecture emphasizes more on the internal logic gate, which means for handling a more complicated task. On another hand, the graphic processor's architecture emphasizes more on the I/O efficiency, which is not suitable for any complicated task, but does provide a higher performance in handing multiple simple tasks in parallel. Therefore, the current invention provides the algorithms purposely to accommodate this architectural difference between the CPU and the graphic processor.

The FIG. 1 depicts a high-level overview of the whole system of the current invention. Basically, each client 10 is either a machine or a running process operated by virtual world users (i.e. players) or by computer AI programs, connecting to the virtual world simulation system through internet or intranet link 18. Inside the virtual world simulation system 16, computing server 12 is a machine or a running process handling incoming client requests either by the attached parallel co-processor(s) or graphic processor(s) 14, or by traditional CPU. More specifically, client requests can be sent directly from client 10 (i.e. the client is making direct connection to computing server) or aggregated by and forwarded from intermediate proxies or gateways to reduce I/O processing overhead (i.e. the intermediate proxies or gateways aggregate and forward client requests to computing server(s)). The attached graphic processor(s) 14 can be used to accelerate the virtual world logic computation by exploiting parallelism through our novel algorithms, which will be explained later. Given the enormous parallel processing power of the graphic processor(s) 14 and the novel algorithms, I can therefore increase the performance and capacity of simulated entities and also cut down the hardware cost of a large virtual world simulation system by multiple times compared to traditional approaches.

To facilitate parallel processing capability from those graphic processor(s) 14 on computing server 12, a set of parallel algorithms to maximize parallelism of computation in virtual world simulation is necessary. FIG. 2 shows an overview of the algorithm, explained as follows:

Given the parallel architecture on these graphic processor(s) 14, I can launch many "processing elements" at once in parallel to process client requests simultaneously. Note that a processing element could be a thread on NVIDIA CUDA-capable GPU, or a task on Intel® Larrabee, depending on which hardware architecture is being used. To process client request(s) in parallel 20, for each processing element, it fetches one or multiple client request(s) 22 and then either updates object state(s) in virtual world(s) immediately or creates so-called "update vector(s)" for later parallel merge 24. While processing client request(s), each processing element may generate additional "request vectors" 26, which could be range query requests (for searching for neighborhood), AI state update requests (for changing the behavior of a NPC), asynchronous messaging request (for sending notification back to client 10), or other tasks in virtual world simulation.

By collecting request vectors and packing those into one or multiple request vector array(s), I can apply similar process 28 on these request vector arrays to update virtual world object states or to generate more update vectors (and also more request vectors). All these update vectors (including those generated from previous phase) can be processed altogether by my parallel merge algorithm 36 to create conflict-free update vectors, which can be committed to memory in the end. The parallel merge algorithm 36 may first uses parallel sorting algorithm (bitonic sort, parallel radix sort, or other sorting algorithm) to re-arrange update vectors so that conflicting update vectors are sitting next to each other (by taking the update target as the sorting key). After that, it tries to find out the range vectors 38 by using parallel difference marking algorithm, in which each processing element takes two corresponding update vectors and outputs true when they're of the same update target, and then apply parallel reduction algorithm to find out the range indices. Given the range indices, I can populate it into range vectors and merge update vectors within the same range into one single, conflict-free update vector and commit the state change into the simulated virtual world 40.

To elaborate the whole process, we provide an example here to give further explanation about the parallel processing for virtual world logics. Suppose there are three players A, B, and C in the virtual world and in a certain moment, player A and B are both sending "attack" requests to attack player C. When we packed requests and sent them as request vectors to graphic processors, at least two "processing elements" will be launched, fetch requests from A and B independently, and create two update vectors, which store the attribute change (i.e. life point decrease) to player C by the requests from A and B. Suppose the attack from A to C decreases C's life point by 3 while the attack from B to C decreases C's life point by 5. If we commit both update vectors directly in parallel (i.e. update player C's life point attribute), an inconsistent state of player C would be introduced since they are writing to the same memory location with different values. Therefore we have to perform a parallel merge on update vectors of the same update targets, which we call them conflicted. After the parallel merge, these two update vectors will be merged into one update vector which decreases C's life point by 8 (3+5). Finally we can take the original value of C's life point, subtract by 8, and store it back.

Based on previous discussion, we have some basic concept to handle virtual world logic computation directly on graphic processors to exploit the parallel computing power to virtual world simulation. Next, we would like to make the system as a "service" so that every virtual world developer may develop their virtual world based on our simulation system and make it accessible to the public. Simply put, we want to make the system as a cloud computing service specifically designed for virtual world simulation. To achieve this goal, we have to address at least two major problems: the massive amount of network traffic from of client interaction and the dynamic deployment for virtual world simulation system.

For the network traffic, since we want to provide the system as a cloud computing service, there could be multiple virtual worlds running at the same time with large amount of connected players, generating massive amount of network traffic. In the same time, we want to keep the same update frequency (which is usually 5 Hz in most MMORPG (Massively multi-player online role-playing game)) to make the interaction responsive while preventing the network not being overwhelmed, so we carried out special architecture design to deal with multiple virtual worlds and to handle up to millions of concurrent players.

As shown in FIG. 3, players make connection to gateways 42 which pack client request as request vectors and forward them to computing server 12 to generate updates to virtual worlds (by using graphic processors 14). Since massive amount of request vectors will be aggregated and forwarded to computing server, the latency between gateway and server must be minimized by using high performance network switch 46. Several high performance interconnect technology could be used here, including Infiniband®, Myrinet®, QsNet, 10 Gigabit Ethernet (IEEE 802.3ae standard), or even 100 Gigabit Ethernet (IEEE P802.3ba) in the future. Also because different virtual worlds may have different response time requirement, or said, quality-of-service (QoS) requirement, we may group multiple gateways into the same group to serve those virtual worlds with the same QoS requirement and ask players belonging those virtual world to connect to that group of gateways.

Besides gateways 42 and computing servers 12, as shown in FIG. 4, there are additional routers 48 which are essentially computer nodes running our specialized software to establish virtual connection tunnels among all other computer nodes (i.e. gateways and computing servers) and build up communication hierarchy to improve scalability on various interconnect fabrics. Routers 48 are dynamically reconfigurable, that is, any computer nodes in the simulation system may simply connect to any router node to communicate to others indirectly (through the virtual channels created by routers), and routers 48 may forward incoming message to the next router until reaching the destination of the message. This results in flexible and dynamic routing scheme in the system and may improve scalability by replacing N*M connections (all pairs between computing servers 12 and gateways 42) with N+M+K connections.

Since we introduce the router 48 to forward messages between computer nodes, messages may travel through multiple routers, which may fail or crash in the course of delivery, so we introduce reliable communication software stack 50 to simplify the communication among computer nodes in the system and improve reliability of the system. FIG. 5 shows the high-level overview of the reliable communication software stack 50 which comprises heterogeneous routing engine 52, reliability engine 54, and remote procedure call framework 56. The heterogeneous routing engine 52 facilitate different transportations, for example, TCP/IP, Infiniband RDMA or iWARP RDMA, to deliver messages through different interconnect fabrics while keeping a unified interface exported for upper layers in the software stack. The heterogeneous routing engine 52 may contain several components like routing table 58, route resolver 60, and connectivity graph 62 to compute the routing information based on local or global connectivity information.

Based on heterogeneous routing engine 52, the reliability engine 54 is built to ensure the reliability of message delivery by using acknowledgement messages. On the top level, the remote procedure call framework 56 is provided based on reliability engine 54 to simplify inter-node communication by encapsulating and exporting program function calls into messages. As a result, all computer nodes (including gateways, computing servers, and routers) in the virtual world simulation system may utilize the hierarchy routing scheme and the reliable communication software stack 50 to talk to each other in a scalable and reliable way.

On the other hand, since multiple virtual worlds may be running concurrently, serving millions of players, the system can't be stopped or shutdown entirely just because someone needs to perform a small update to one of the running virtual worlds. Therefore, in addition to the virtual world simulation system, we invent the dynamic deployment system with regards to the limitation of graphic processor(s) 14 that we used on computing servers 12. Given the fact that there is no dynamic loading or dynamic linking capability on most graphic processors, the program running on graphic processor must use static linking and compile everything used in one kernel launch into one single binary file. Furthermore, there is no virtual memory design on graphic processor so that allowing direct memory manipulation for virtual world developers could be fatal and insecure. For that reason, we ought to provide a special front-end scripting language to forbid direct memory manipulation. The scripting language could be some custom defined language or some conventional scripting language like Lua, Python, JavaScript, or ActionScript.

As shown in FIG. 6, the virtual world definitions can be implemented in scripting language 68 by the virtual world developers and submitted to the dynamic deployment system. Then the virtual world compiler 70 parses those definitions and generates intermediate codes on both host CPU 72 and graphic processor 74. Supplied with corresponding virtual world libraries 80 82, the compilers for host CPU 76 and graphic processor 78 generate binary codes on host CPU 84 and that on graphic processor 86 accordingly. Finally, binary codes are sent to dynamic deployment runtime 88 which replaces the running code segment on host CPU and graphic processor with the new ones and performs necessary updates. The code replacement and updates may be also performed in a batched manner to avoid the performance hit.

According to the method for simulating a virtual world by utilizing a parallel co-processor with a dedicated memory of the invention, the method comprises performing a parallel logic processing by said parallel co-processor, wherein said performing said parallel logic processing comprises: performing a count phase, wherein said performing said counting phase comprises: determining a first plurality of update counts for a plurality of threads in a counting phase by said parallel co-processor; storing said first plurality of update counts into said dedicated memory; and allocating a memory block from said dedicated memory according to said first plurality of update counts for storing said plurality of update vectors without any memory conflict; performing a storing phase, wherein said performing said storing phase comprises: writing updates into said memory block; performing a parallel conflict merge by said parallel co-processor, wherein said performing said parallel conflict merge comprises: generating a sorted list from said first plurality of update vectors; generating a first separation list from said sorted list; generating a first store indices list; generating a merge list based on said first separation list and said first store indices list; and performing parallel merge based on said merge list; performing a parallel range query by said parallel co-processor, wherein said performing said parallel range query comprises: calculating a plurality of affected buckets based a second plurality of update vectors, wherein said virtual world is divided into a plurality of buckets, each bucket is a square or a cube with an edge length equal to a visibility range, and each of said plurality of affected buckets is within said visibility range from any of said second plurality of update vectors; generating a second separation list from said plurality of affected buckets; generating a second store indices list; determining a second plurality of update counts based on said plurality of affected buckets; allocating a second memory block from said dedicated memory according to said second plurality of update counts for storing said plurality of affected buckets.

According to the method of the invention for simulating the virtual world as described above, wherein the parallel co-processor is a graphic processing unit.

According to the method of the invention for simulating the virtual world as described above, wherein the parallel co-processor is a field-programmable gate array (FPGA).

According to the method of the invention for simulating the virtual world as described above, wherein said virtual world is a Massive Multiplayer On-Line Game (MMOG).

According to the method of the invention for simulating the virtual world as described above, wherein said generating said first separation list further comprises comparing two adjacent elements in said sorted list.

According to the method of the invention for simulating the virtual world as described above, wherein said allocating said first memory block from said dedicated memory further comprises: performing a parallel prefix sum on said first plurality of update counts to determine a storage requirement for storing a plurality of update vectors by said parallel co-processor; and allocating said first memory block according to said storage requirement.

According to the method of the invention for simulating the virtual world as described above, wherein said first plurality of update vectors is identical to said second plurality of update vector.

According to the method of the invention for simulating the virtual world as described above, wherein said generating said first separation list further comprises comparing two adjacent elements in said sorted list.

According to the method of the invention for simulating the virtual world as described above, wherein before calculating said plurality of affected buckets based said second plurality of update vectors, the method further comprises performing a parallel sort on the target of update vectors.

According to the method of the invention for simulating the virtual world as described above, wherein the parallel sort is a parallel load balanced radix sort.

According to the method of the invention simulating the virtual world as described above, wherein the parallel load balanced sort is a parallel load balanced bitonic sort.

DETAILED DESCRIPTION OF THE PREFERRED EMBODIMENT

Graphics Processor Unit (GPU)

Figure 1:
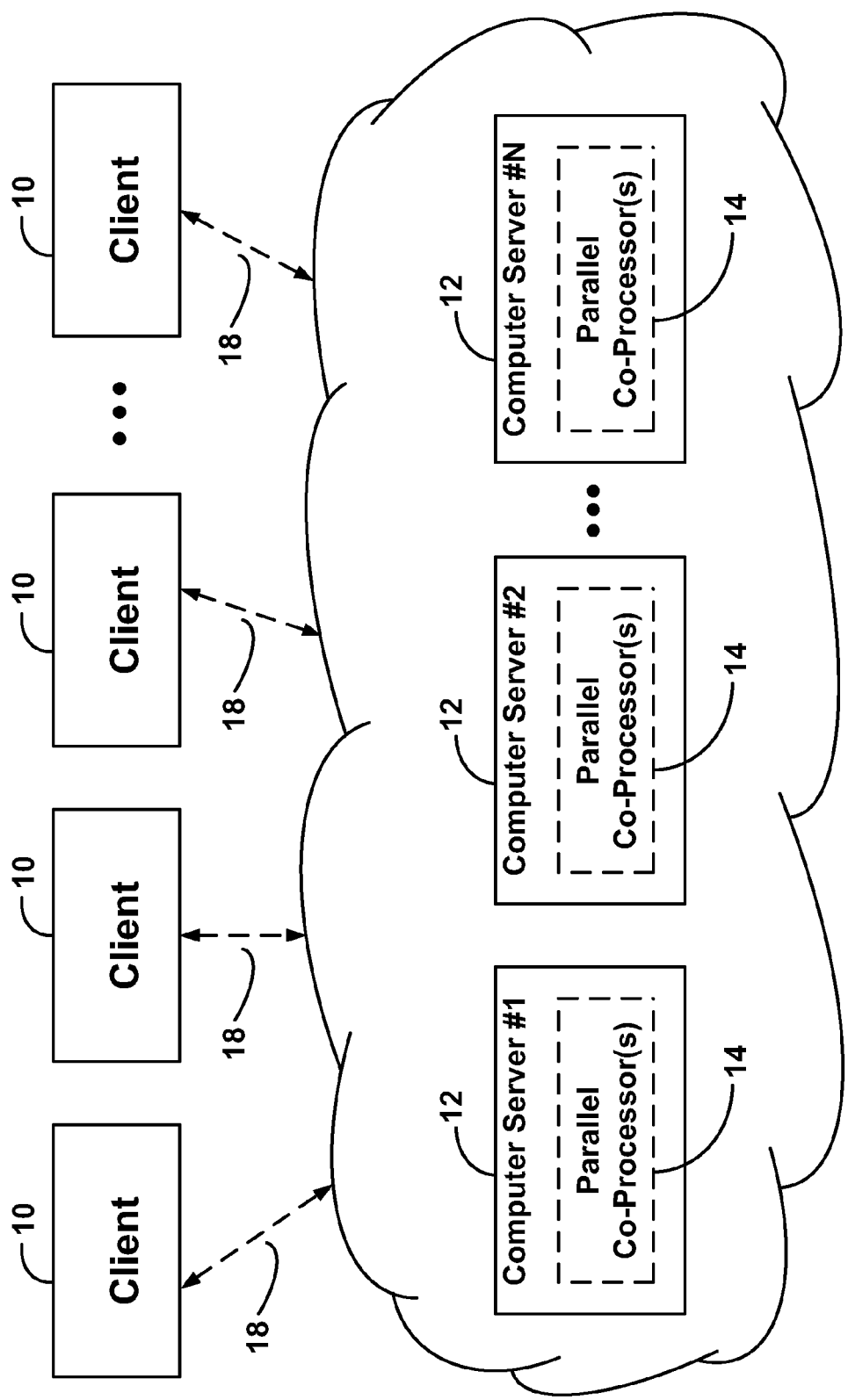
FIG. 1 depicts a high-level overview of the whole system of the current invention.
Figure 2:
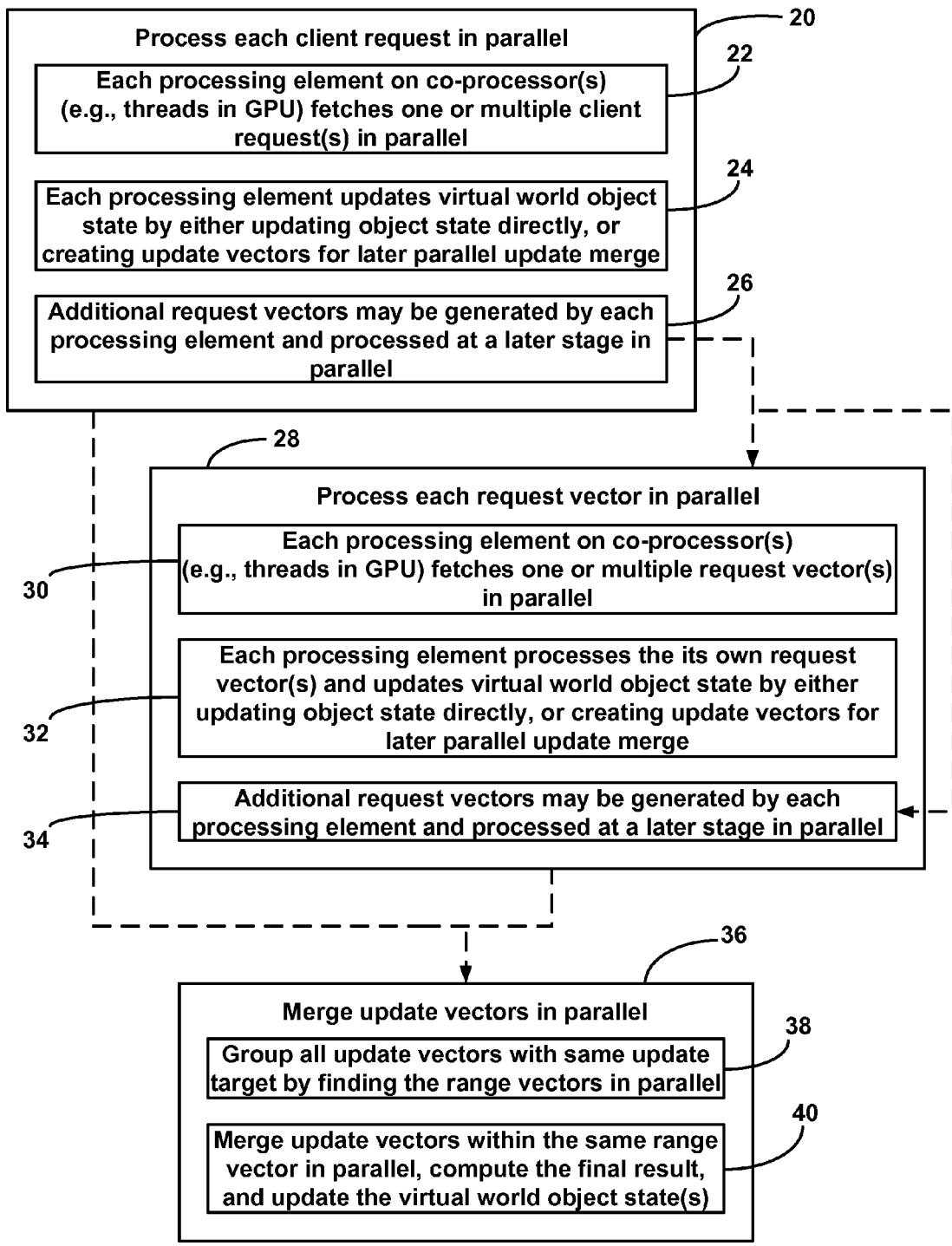
FIG. 2 depicts an algorithm for simulating virtual world on parallel co-processor(s).
Figure 3:
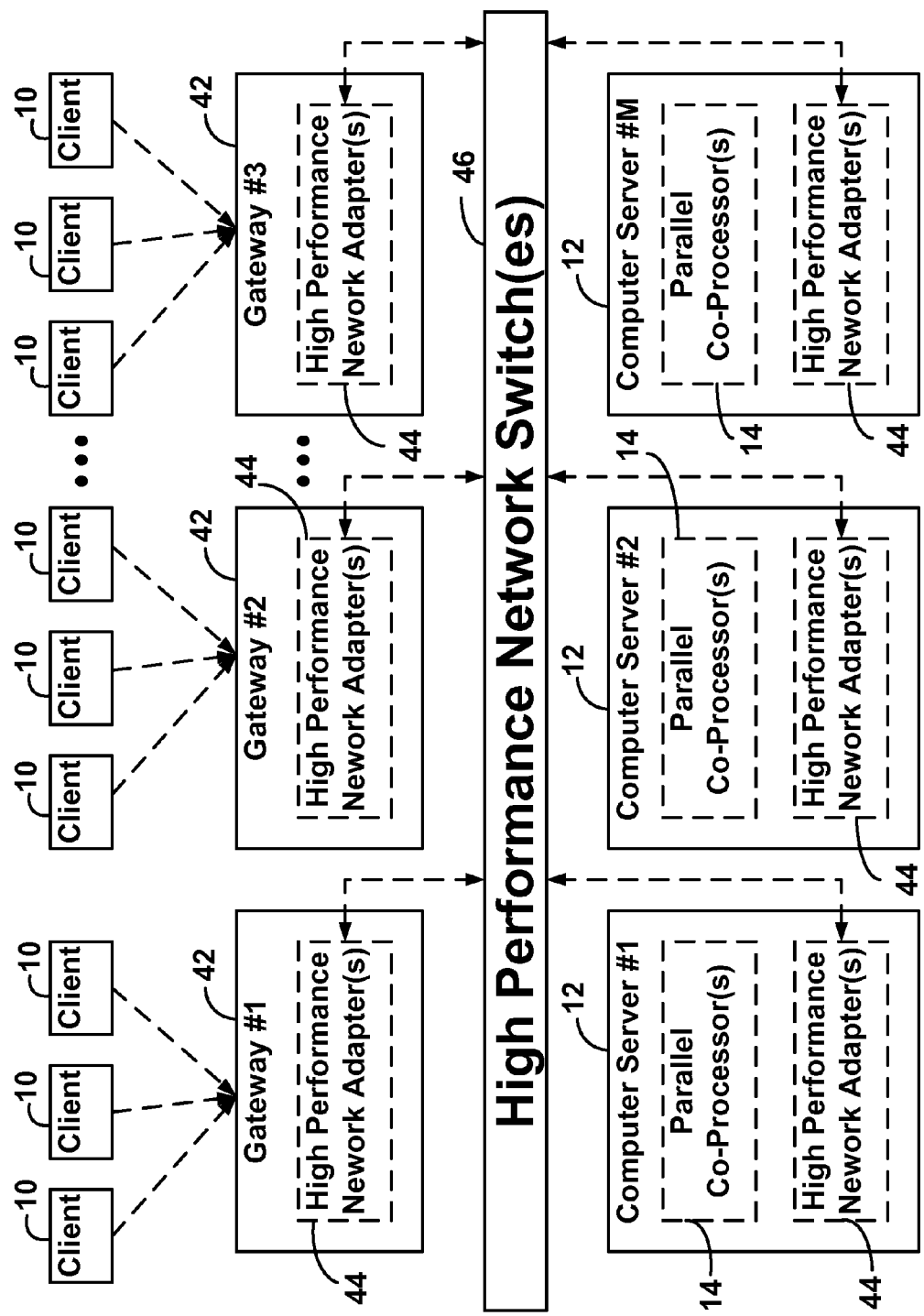
FIG. 3 depicts detailed network architecture of the virtual world simulation system.
Figure 4:
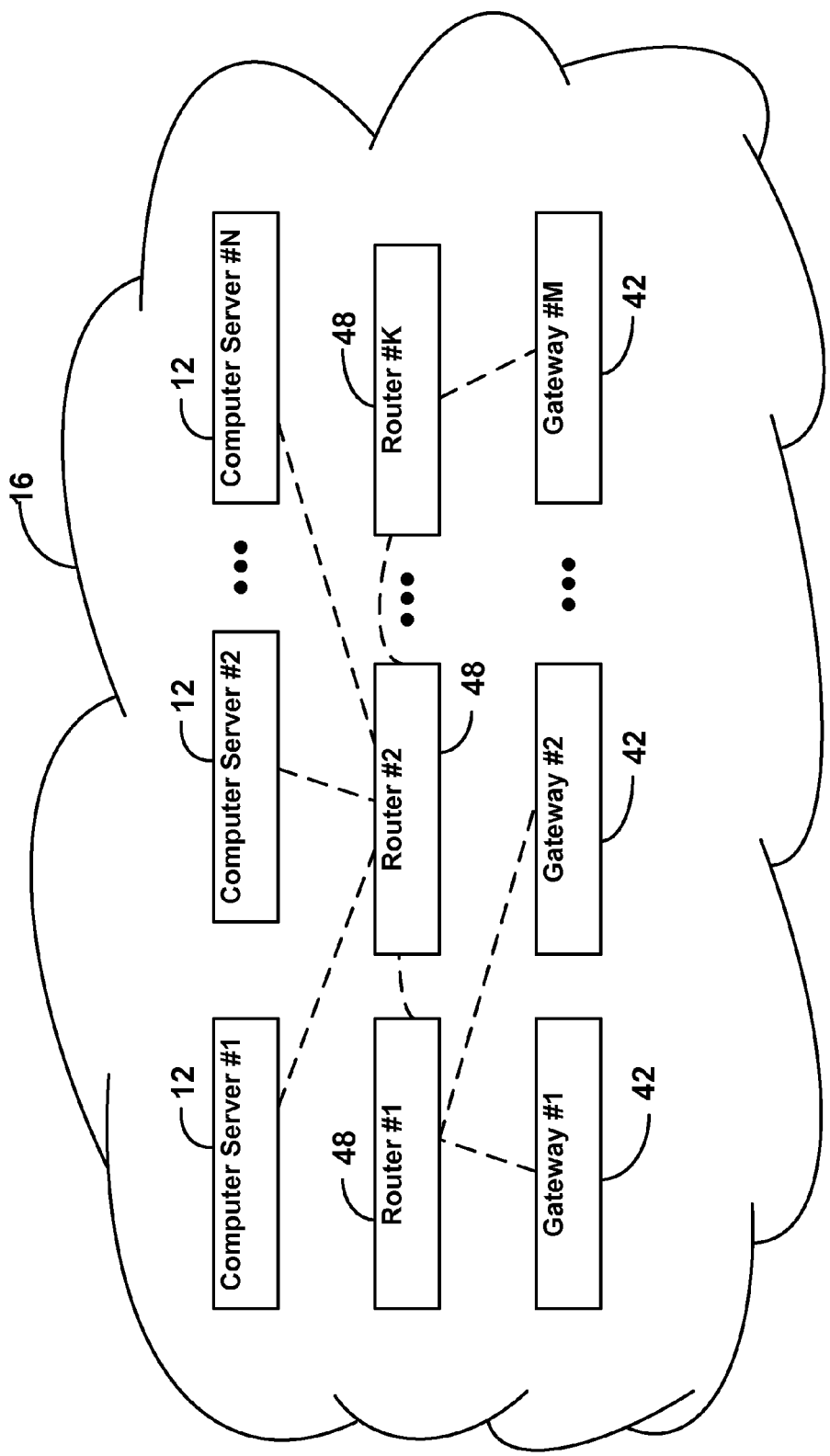
FIG. 4 depicts a dynamic and reconfigurable routing hierarchy.
Figure 5:
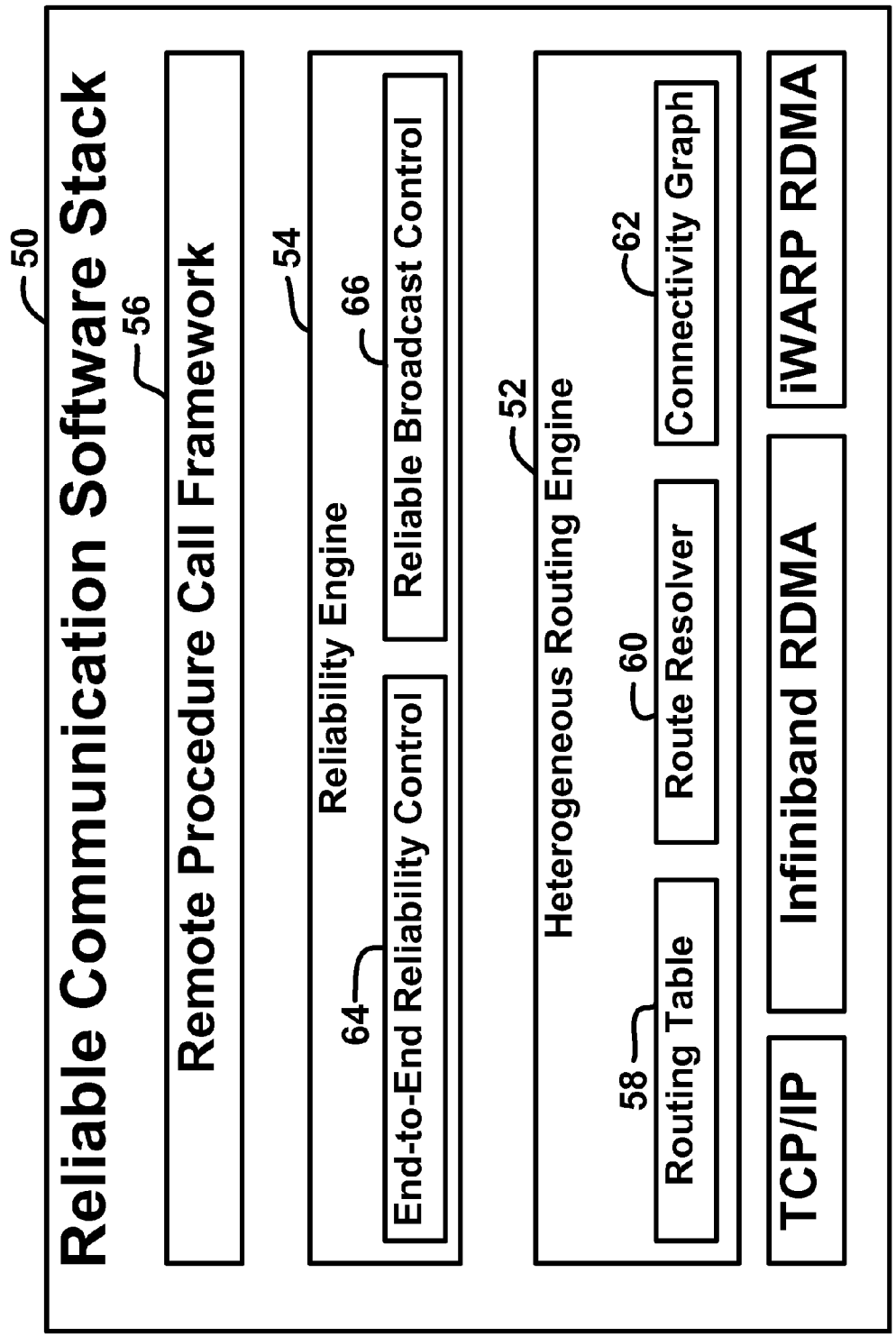
FIG. 5 depicts an overview of reliable communication software stack.
Figure 6:
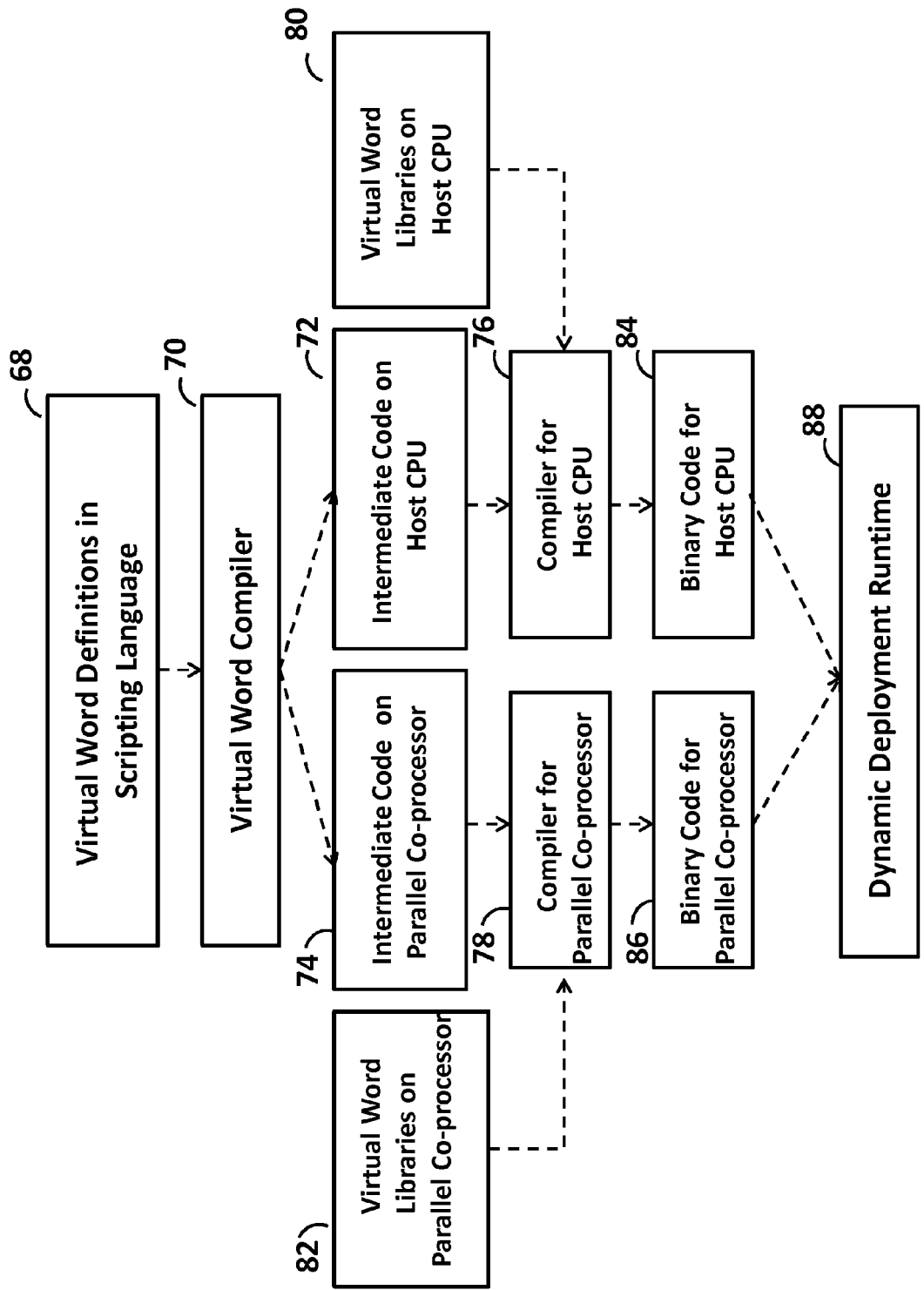
FIG. 6 depicts dynamic deployment and compilation flow in virtual world simulation system.
Figure 7:
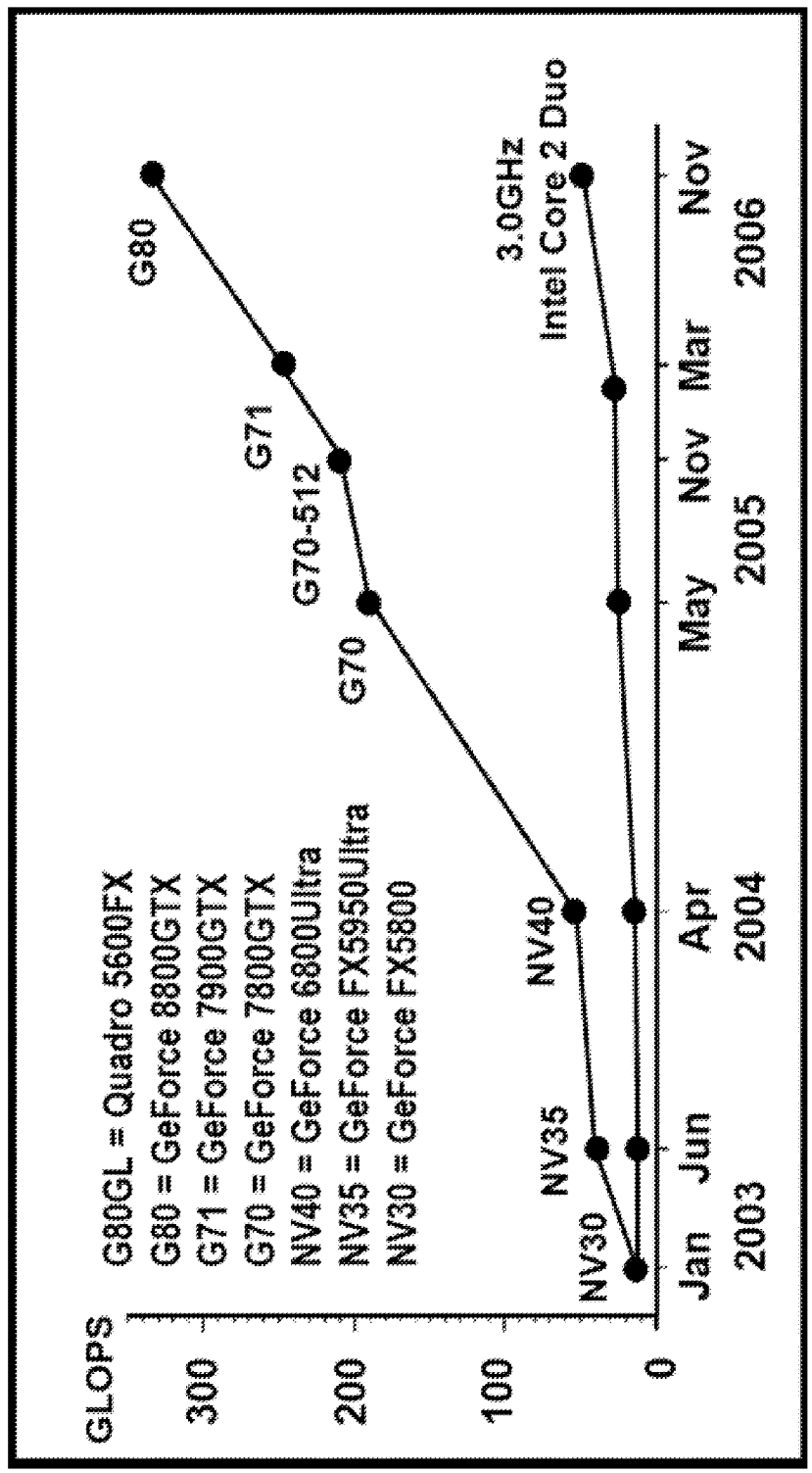
FIG. 7 depicts a diagram illustrating the Floating-Point Operations per Second for the CPU and GPU.

As mentioned above, the GPU technology changed a lot in both hardware and software in the last decade. In hardware, fixed-function rendering pipeline is obsolete and new programmable pipeline consist of multiple SIMD processor is a de facto standard in the GPU industry. The comparison of computation power between GPU and CPU was depicted as FIG. 7. As for software, the OpenGL® persists, but many extensions have been added by the OpenGL® ARB to facilitate the use of programmable pipeline. Based on the programmable pipeline and the SIMD architecture of current GPU, one can map a compute-intensive problem into multiple small pieces, solve the problem within a pixel-rendering context (because the pixel rendering is programmable), and finally store the result in the frame buffer object. This is the basic concept of general purpose computation on graphics hardware, also called GPGPU.

However the mapping is not straightforward, we may need to design some special data structure and modify the algorithm in the way we do graphics rendering. Fortunately, the two biggest GPU manufacturers: NVIDIA® and AMD®/ATI® have just opened the computation power to public via some programming interface other than OpenGL, which we will introduce later.

Before digging into the latest development of GPU programming, we give the history of OpenGL first to get better understanding of the benefit from the new programming architecture.

OpenGL® was developed by SGI in early 90s to standardized access to graphics hardware, and eased the development of 3D computer graphics by providing high-level and simple set of APIs. Since 90s, there are several revisions of OpenGL® to adopt new graphics hardware. Among all the revision, the most important one is the standard of OpenGL 2.0, in which the OpenGL® Shading Language, GLSL for short, is introduced. GLSL provides high level construct to write shader, which is the program that is executed on each vertex or pixel is rendered. As long as we can encapsulate the data into textures, and transform the work into numbers of independent pixel renderings, the problem can be executed in parallel on GPU.

However, shader comes with limits since GPU is not designed under the same principle of CPU. You can never arbitrarily write to any memory location but only the corresponding output pixel in a shader. This is known scatter write operation, which is prohibited on GPU because read-after-write hazard would occur to damage the GPU performance if such operation is allowed. Under these constraints, GPU algorithms are even harder to be developed then traditional algorithm and was turned into a very active research field in the last few years.

In addition, NVIDIA® proposed Cg in 2003 to further lower the burden of GLSL by providing C standard language construct to write shaders. However the Cg itself does not manipulate the graphics hardware directly, but instead, they transform Cg codes into standard GLSL code by compiler techniques; as a result, Cg does not relief the constraint on GPU but only providing a friendly and easy-to-use development environment.

CUDA (Compute Unified Device Architecture), as the name stands for, is the architecture to unify the general computation model on graphics devices. Just like the Cg they invented previously, CUDA uses standard C language with some simple extensions such as templates and C++ style variable declaration. This gives programmer a great convenient to develop GPU application. From now on, we will introduce to CUDA in more detail because we will use CUDA to implement the entire system, and CUDA is much different from OpenGL or any other popular programming language in many perspectives.

The most important advantage of CUDA over graphics API for making traditional general computation on GPU is the scattered write capability. To explain, scattered write means that code written in CUDA can write to arbitrary addresses in memory, which is not possible in traditional pixel shader programming (unless combined with the vertex shader, but this is extremely inefficient). CUDA provides scatter write to make many parallel algorithm possible to be implemented on GPU, such as parallel prefix sum algorithm (also called the SCAN operation) and efficient bitonic sort.

Figure 8:
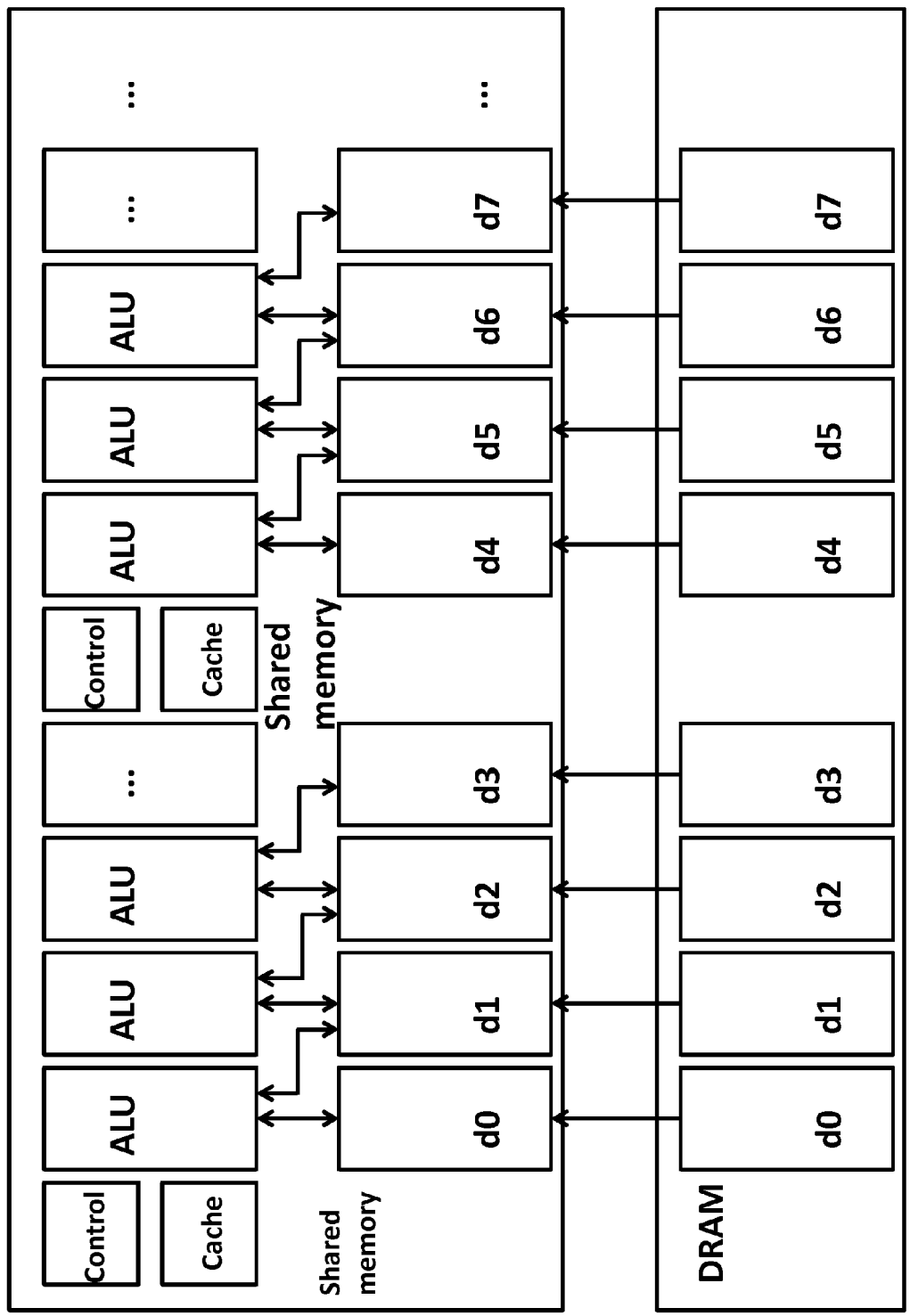
FIG. 8 depicts the Shared Memory Architecture for GPU.
Figure 9:
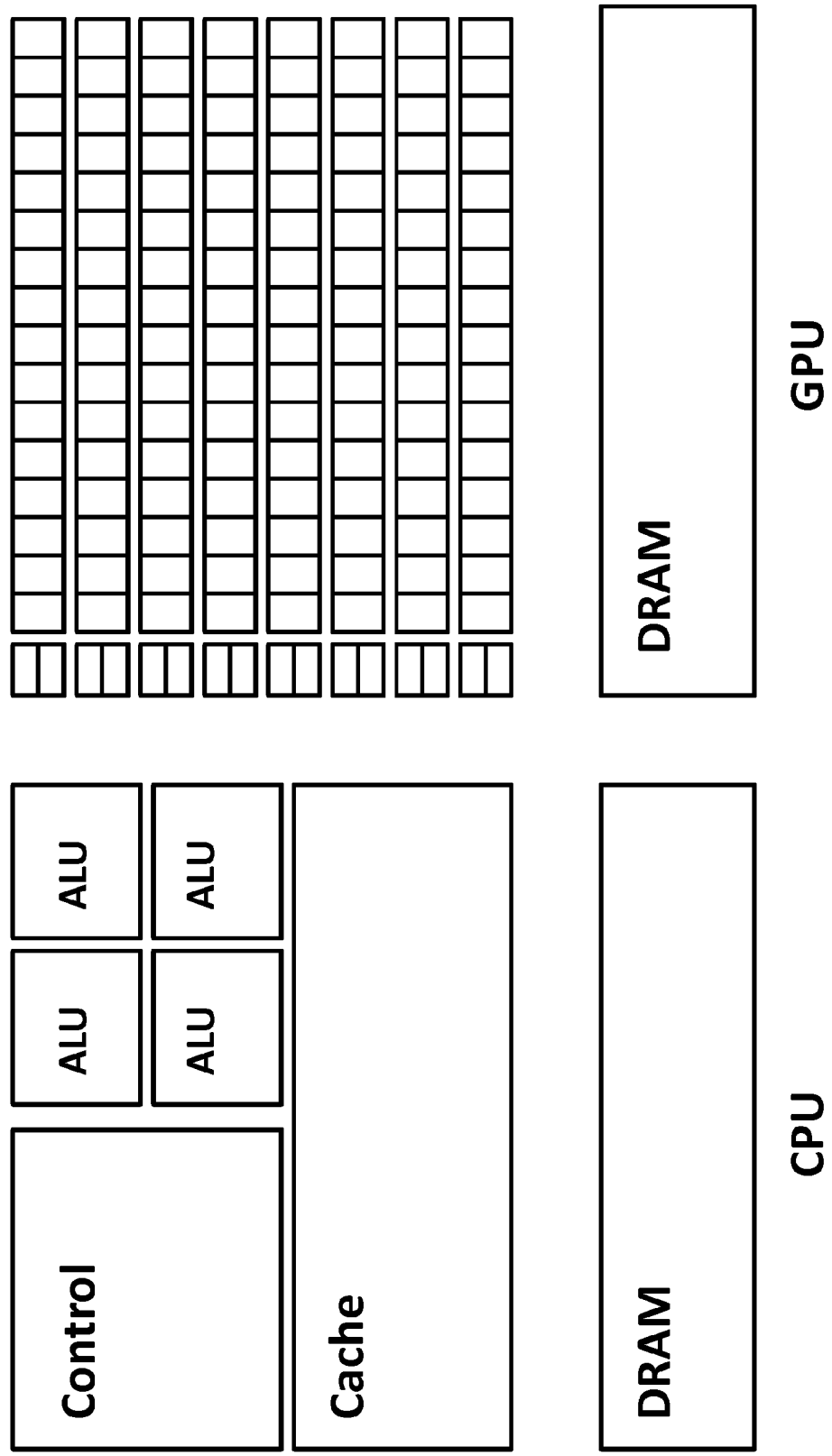
FIG. 9 depicts the Massively Threaded Architecture.

Along with scatter write, CUDA further exposed a fast shared memory on GPU that can be shared among numbers of processors as FIG. 8. The shared memory can be used as a user-managed cache, enabling extreme high bandwidth than traditional texture look up, which is actually accessing global memory. Furthermore, as stated in the CUDA official document, when programmed through CUDA, GPU is viewed as a compute device that is capable of executing a very high number of threads in parallel as FIG. 9. This is called massively threaded architecture. To explain further, each kernel can be executed by a grid of blocks, and each block contains a grid of threads that is conceptually mapped to a single SIMD processor. Threads within the same block can communicate with each other via per-block shared memory and get synchronized at a specific point of execution. A Block can be regarded as a set of threads within the same execution context. However, unlike thread, there is no synchronization capability among blocks.

As for the memory model of CUDA, there are six different types of memory that can be access either in read-write mode or in read-only mode, summarized as follows:

| Memory Addressing Spaces available on CUDA | | | | |
|---|---|---|---|---|
| Name | Accessibility | Scope | Speed | Cache |
| Registers | read/write | per-thread | zero delay (on chip) | X |
| Local Memory | read/write | per-thread | DRAM | N |
| Shared Memory | read/write | per-block | zero delay (on chip)* | N |
| Global Memory | read/write | per grid | DRAM | N |
| Constant Memory | read only | per-grid | DRAM | Y |
| Texture Memory | read only | per-grid | DRAM | Y |

Figure 10:
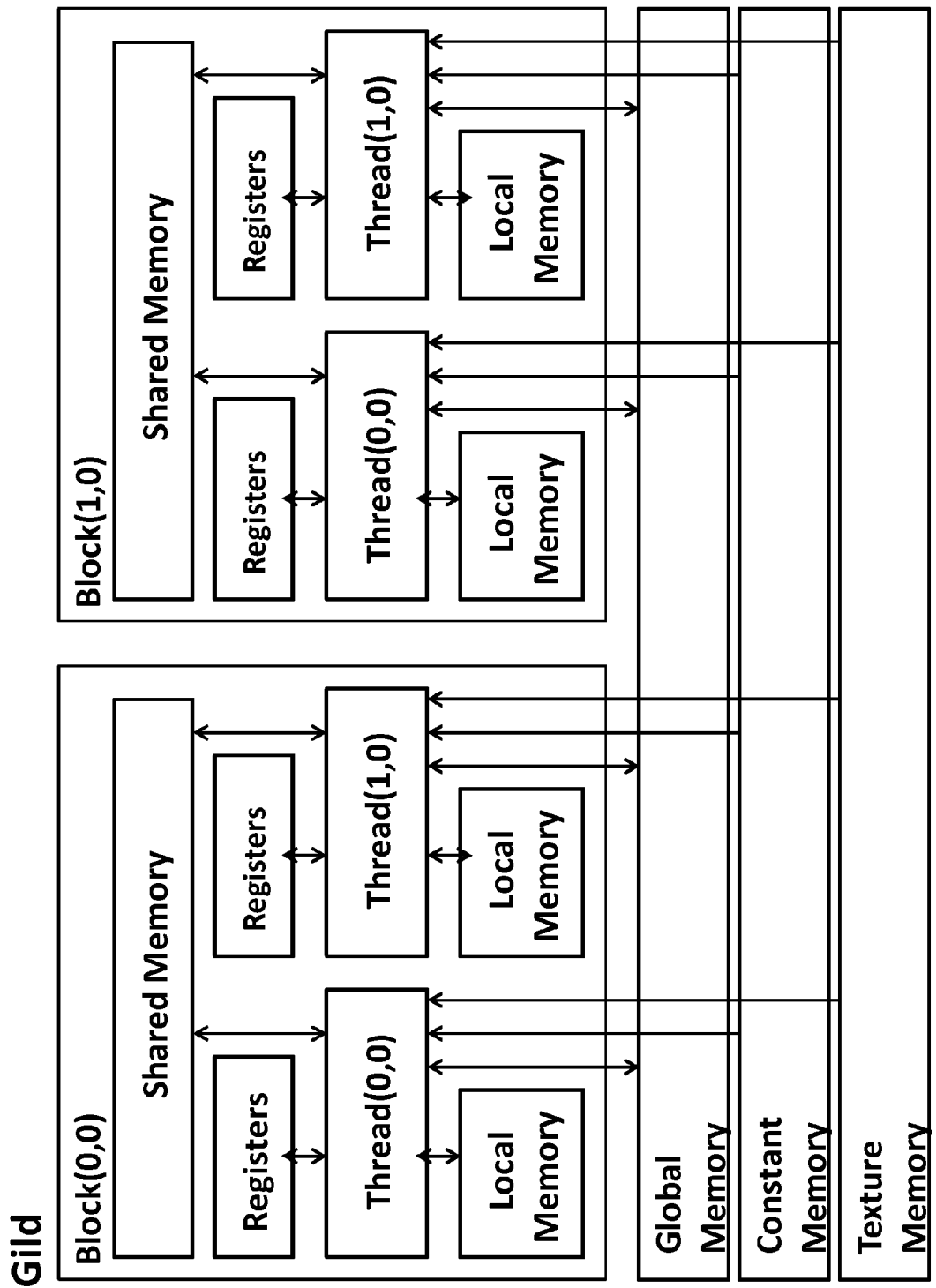
FIG. 10 depicts the Physical Memory Model on GPU.

FIG. 10 Error! Reference source not found. shows the graphical layout of memory on GPU. In fact, there are only two types of memory physically on GPU: the on-chip memory and the device memory, but they are divided into different memory spaces for different purposes of use. The on-chip memory is embedded in the SIMD processor that only 2 clocks needed to read from or write to. The access to device memory usually takes up to 200~300 clocks, which is relatively slow compared to on-chip memory. The shared memory located on the chip can be regarded as a user-managed cache for the SIMD processor. A typical usage of shared memory is used to cache specific data read from global memory to avoid duplicate read. Also, shared memory can be served as an inter-process communication medium for all threads with almost zero overhead.

Although CUDA seems an ideal choice to do parallel programming, it comes with some limitation due to the current hardware design. For example the branching within the same block could be expensive as they are executed on a SIMD processor. So if threads take different execution path, they must be serialized by the thread scheduler on GPU. Finally, while GPU is communicated with CPU through the PCI-Express bus, the cost to download/upload data from/to GPU would be expensive. As a result, frequent data transfer between CPU and GPU should be avoided whenever possible. For more details about CUDA, please refer to the CUDA programming guide.

Compared to NVIDIA® CUDA, the second largest GPU manufacturer AMD/ATI announced the STREAM, which was previously named Close To Metal (CTM) technology. With similar goal of CUDA, STREAM tries to expose the computation power of GPU for the public to apply GPU to general purpose computation. However, in a very different approach from CUDA, STREAM does not provide the comprehensive toolkits like C++ compiler, linker and high-level C language construct, but only a set of outdated GPGPU primitives. This is really daunting for most developers. Therefore, till now, STREAM does not attract much attention although STREAM almost covers all aspect of what CUDA can do.

GPU-Assisted MMOG System Architecture

Figure 11:
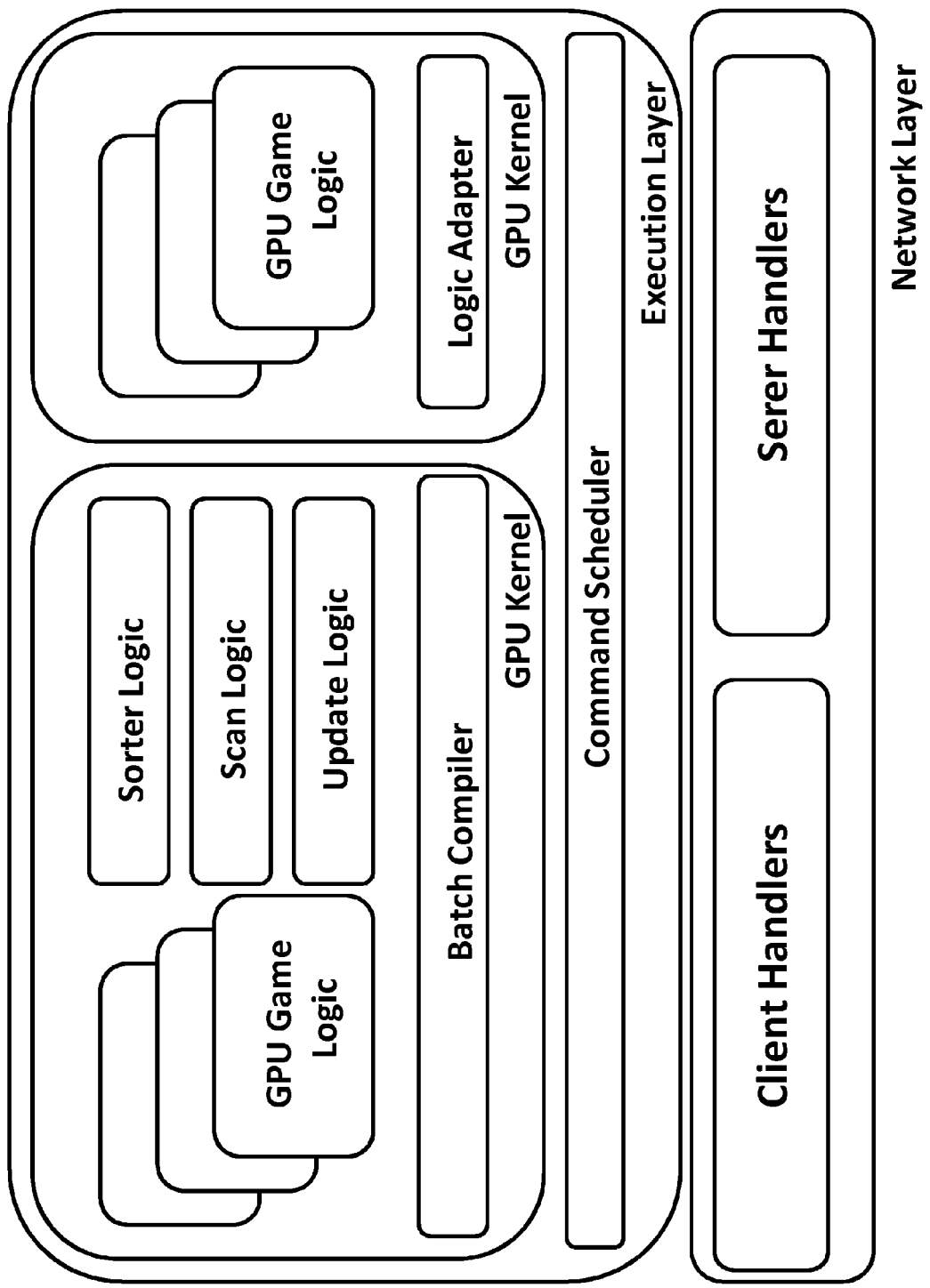
FIG. 11 depicts the logic execution layer of GPU-assisted MMOG system.

The entire GPU-assisted MMOG system framework was depicted in FIG. 11. Basically, the framework can be stratified into 3 layers by their functionalities: the network layer, the control layer, and the execution layer.

Network layer provides reliable unicast and multicast transport to assist inter-process communication in the online game network. With modern high performance and fault-tolerant communication middleware and gateway/server architecture, we can handle massive amount client requests and exchange data among servers efficiently.

Execution layer, which is the kernel of the system, handles all client commands received from network layer and dispatch all commands to corresponding logic (i.e. handler) according to the types of the commands. To maximize the number of concurrent users, we used GPU to assist the logic computation on server based on NVIDIA® CUDA framework.

To elaborate, basically clients interact with servers based on well-known server/gateway architecture as follows. First, the client sends corresponding commands to the proxy he connected to, as the player manipulates his/her character. Upon the arrival of the client command, the proxy relays the command along with those from other clients to the game server. The game server collects all client commands, compiles into request list, and uploads to GPU memory. GPU then processes client commands by a great number of blocks of threads, updates the game world in parallel, and finally compiles the update vectors into a continuous array. Next, update vectors are downloaded to CPU memory. By the update vectors, clients that are affected by the changes of the world need to be notified by sending player state updates via the corresponding proxies. Each proxy will then forward the state updates to clients and finally the result is rendered on clients' display.

Parallel Algorithm on CUDA

For most parallel algorithm, the parallel sorting and parallel prefix sum algorithm are the basic building essential. As a result, we implemented load balanced parallel radix sort and parallel prefix sum, and optimized it according to the GPU architecture constraints.

For implementation, due to the bandwidth limit between GPU memory and host memory in current commodity computers, we must avoid data transfer as much as possible to get the best performance. For that reason, we try to process the client commands and virtual world updates completely on GPU. Client commands are compiled as a request array and sent to GPU by command scheduler. Next, GPU will process all client commands in the request array in parallel, merge all update conflicts, identify those who are near these altered players by bucket indices, and finally generate the update array. The update array will be read back from GPU memory to CPU memory and be processed by CPU. Each item in the update array is a vector consists of the player id to send update, the altered player id, the altered data id, and the new value of the data. CPU will send the altered player state update to the nearby player according to the update vector.

Parallel Logic Processing Algorithm

As processing client commands on GPU, we must store the player information needed during the execution of logic. Since the GPU memory size is limited, we only store a part of data of player states relevant to GPU game logics. For example, we may need to store the position of players as a small chunk on GPU if we have the move logic on GPU.

Logic on GPU can be regarded as a set of chunk update rules, that is, it might request to modify a number of chunks in player states according to predefined rules by writing a list of update vector of player id, chunk id, and value offset. Note that there could be multiple update vectors toward the same player id with the same chunk id, which lead to conflicts. We will introduce the parallel update conflict merge algorithm to address the problem in the next section.

However to make the logic processing parallel is not that straightforward. To make it parallel, we need to split all logics into two phases, the counting phase and storing phase. In the counting phase of the specific logic, we compute the number of updates that will be generated in the logic and store the update count into global memory on GPU by each thread. After that, we perform parallel prefix sum to calculate the exact memory location to store all update vectors in a continuous block of memory. Given the memory locations, the storing phase of the logic is then performed and writing all updates to global memory without any address conflict.

For example, suppose we have an attack logic implemented on GPU, different update counts will be stored by each thread in the update count array. For example, 5 updates for thread 1 will be generated later, 3 updates for thread 2, and 1 update for thread 3. The update count array will look like {5, 3, 1 . . . }. After parallel prefix sum is applied, the update count array becomes {0, 5, 8, 9 . . . }, in which each element is exactly the sum of all elements before. Based on the prefixed update count, each thread can safely store the update vectors into global memory without write-after-write hazards.

Although game logics are designed based on the game's philosophy, we implemented the simple move logic to demonstrate the two-phase concept as the algorithms shown in the sample codes:

---

The count phase of the parallel move logic
Algorithm PlayerMoveLogic_CountPhase (plist, np, rlist, nr, uclist);

---

Input: plist (an array of player state vectors of size np), rlist (an array of request vectors of size nr).
Output: uclist (an array of size nr containing update counts for each request).
begin
    declare shared request_vector shm[ ] ;
    declare integer bs = 512 ;
    declare integer gs= ceil(nr/block_size) ;
    for bid:=0 to gs−1 do in parallel
        for tid:=0 to bs−1 do in parallel
            declare integer global_tid := bid*bs + tid ;
            if global_tid < nr then
                shm[tid] := rlist[tid] ;
                if shm[tid].type = TYPE_MOVE then
                    uclist[tid] := 1 ;
                else
                    uclist[tid] := 0 ;
end

---

The store phase of the parallel move logic
Algorithm PlayerMoveLogic_StorePhase (plist, np, rlist, nr, uslist, ulist);

---

Input: plist (an array of player state vectors of size np), rlist (an array of request vectors of size nr), uslist (an array of indices where each thread stores the updates).
Output: ulist (an array of update vectors of size nr).
begin
    declare shared request_vector shm[ ] ;
    declare integer bs := 512 ;
    declare integer gs := ceil(nr/block_size) ;
    for bid:=0 to gs−1 do in parallel
        for tid:=0 to bs−1 do in parallel
            declare integer global_tid := bid*bs + tid ;

-continued

The store phase of the parallel move logic
Algorithm PlayerMoveLogic_StorePhase (plist, np, rlist, nr, uslist, ulist);

```
    if global_tid < nr then
        shm[tid] := rlist[tid] ;
        if shm[tid].type = TYPE_MOVE then
            declare update_vector upd ;
            upd.playerID := shm[tid].playerID ;
            upd.chunkID := PLAYER_POSITION ;
            upd.offset := calculateOffset(shm[tid]) ;
            ulist[uslist[tid]] := upd ;
end
```

The parallel move logic on GPU
Algorithm PlayerMoveLogic (plist, np, rlist, nr, ulist) ;

Input: plist (an array of player state vectors of size np), rlist (an array of request vectors of size nr).
Output: ulist (an array of update vectors of size nr).
begin
    declare global integer uclist[nr] ;
    declare global integer uslist[nr] ;
    PlayerMoveLogic_CountPhase(plist, np, rlist, nr, uclist) ;
    ParallelPrefixScan(uclist, nr, uslist) ;
    PlayerMoveLogic_StorePhase(plist, np, rlist, nr, uslist, ulist) ;
end Parallel Conflict Merge Algorithm As mentioned above, there may be update conflicts in the update vectors generated by game logics. To address the problem, we propose the parallel update conflict merge algorithm to merge conflict updates into one conflict-free update. For example, when more than one player is attacking someone else, there will be multiple attack commands in a single update iteration requested by different player, but their targets are same. In this case, multiple update vectors will be generated by different threads and stored in the update array. We have to find out all those conflict updates and sum up all their offsets as one, and replace all update vectors by the new update vector.

The algorithm works as follows. In the first step, we need to sort the list of update vectors in parallel according to their player id and chunk id. Ultimately, we want to find out the interval to merge on the sorted list. Therefore, we check each interval between any two adjacent elements in the sorted list to see if the left and the right elements are in conflict with each other. We call this separation marking. If the left and the right elements are conflict-free, then 1 is written to the separation list as a separation mark. Otherwise, 0 is written. After the separation list is filled out, all update vectors in-between two 1 marks will need to be merged. To find out all the memory address to write those conflict-free update vectors, the parallel prefix sum is performed on the separation list to get the store indices for separation. Given the separation list and the store indices list, we can easily transform the separation marks into the intervals to merge. Take an example; if the sorted vectors are as follows (each vector is in the form {player id, chunk id, value, offset}):
    {{player 0, PLAYER_HP, 100, −5},
    {player 0, PLAYER_HP, 100, −10},
    {player 1, PLAYER_HP, 250, −20},
    {player 2, PLAYER_HP, 300, −30},
    {player 2, PLAYER_HP, 300, −50},
    {player 3, PLAYER_HP, 100, −5}}

The resulting separation list will be {0, 1, 1, 0, 1}, and after prefix scanned, the store indices list becomes {0, 0, 1, 2, 2}, which indicates a starting position for each item in the resulting separation list. We spawn a thread on each element of separation list to generate the merge list. Each thread check the corresponding element and write the current thread index to global memory at the location specified in the store indices list in case that corresponding element equals to 1, which is a separation mark. After the transformation, we will have the merge list like {1, 2, 4}, which indicates numeric positions of "1" in the resulting separation list.

The final step is to perform parallel merge on the sorted list of update vectors according to merge list. Following the last example, given the merge list {1, 2, 4}, we need to merge {[0, 1], [2, 2], [3, 4]}. We can use one thread for each interval between two adjacent elements in the merge list to sum up all the offsets in-between.

Game logics are designed based on the game's philosophy, we implemented the simple move logic to demonstrate the two-phase concept as the algorithms shown in the following sample codes:

Separation mark for the parallel merge conflict algorithm
Algorithm MergeConflict_MarkSeperation (ulist, nu, seplist) ;

Input: ulist (an array of update vectors of size nu).
Output: seplist (an array of indices of size nu).
begin
    declare shared update_vector shm[ ] ;
    declare integer bs := 256 ;
    declare integer gs := ceil(nu/bs) ;
    for bid:=0 to gs−1 do in parallel
        for tid:=0 to bs−1 do in parallel
            declare integer global_tid := bid*bs + tid ;
            if global_tid < nr then
                shm[tid] := ulist[tid] ;
            declare update_vector tl, tr ;
            synchronize_threads( ) ;
            if global_tid < nu then
                tl := shm[tid] ;
            synchronize_threads( ) ;
            if global_tid < nu && (tid != bs−1 or bid != gs −1) then
                if tid = block_size−1 then
                    tr := ulist[global_tid+1] ;
                else
                    tr := shm[tid+1] ;
                declare integer mark := 0 ;
                if tl.playerID = tr.playerID && tl.chunkID = tr.chunkID then
                    mark := 1 ;
                synchronize_threads( ) ;
                if global_tid < nu then
                    seplist[global_tid] := mark ;
end Store separation indices for the parallel merge conflict algorithm
Algorithm MergeConflict_StoreSeperation (seplist, silist, ns, mergelist) ;

Input: seplist (an array of size ns containing either 0 or 1 for the mark of separation), silist (an array of indices as memory location references of size ns).
Output: mergelist (an array of indices of size nu to store the separation indices).
begin
    declare integer bs := 256 ;
    declare integer gs := ceil(nu/bs) ;
    for bid:=0 to gs−1 do in parallel
        for tid:=0 to bs−1 do in parallel

Store separation indices for the parallel merge conflict algorithm
Algorithm MergeConflict_StoreSeperation (seplist, silist, ns, mergelist) ;

```
declare integer global_tid := bid*bs + tid ;
declare integer mark := 0 ;
declare integer reference_address := 0 ;
if global_tid < ns then
    mark = seplist[global_tid] ;
synchronize_threads( ) ;
if global_tid < ns && mark > 0 then
    reference_address := silist[global_tid] ;
synchronize_threads( ) ;
if global_tid < ns && mark > 0 then
    mergelist[reference_address] := global_tid ;
end
```

Merge conflict intervals for the parallel merge conflict algorithm
template < class T>
Algorithm MergeConflict_MergeInterval (ulist, nu, mergelist, nm, cfulist) ;

Input: ulist (an array of update vectors of size nu), mergelist (an array of separation indices of size nm).
Output: cfulist (an array of conflict-free update vectors of size nm+1).
```
begin
    declare shared integer shm[ ] ;
    declare integer bs := 256 ;
    declare integer gs := ceil(nu/bs) ;
    for bid:=0 to gs-1 do in parallel
        for tid:=0 to bs-1 do in parallel
            declare integer global_tid := bid*bs + tid ;
            shm[tid] := mergelist[global_tid] ;
            synchronize_threads( ) ;
            declare integer si := 0 ;
            declare integer ei := 0 ;
            declare T offset := T( ) ;
            declare update_vector upd ;
            if global_tid < nm then
                if global_tid = 0 then           si := 0 ;
                else    if tid = 0 then           si := mergelist[global_tid-1] ;
                else                              si := shm[tid-1] ;
                ei := shm[tid] ;
                for m:=si to ei do
                    upd := ulist[m] ;
                    T := T + upd.offset ;
                upd.offset := offset ;
                cfulist[global_idx] := upd ;
            if global_tid = nm-1 then
                si := shm[tid] ;
                ei := nu-1 ;
                for m:=si to ei do
                    upd := ulist[m] ;
                    T := T + upd.offset ;
                upd.offset := offset ;
                cfulist[global_idx+1] := upd ;
end
```

The parallel merge conflict algorithm
Algorithm MergeConflict (ulist, nu, cfulist) ;

Input: ulist (an array of update vectors of size nu).
Output: cfulist (an array of conflict-free update vectors of size nu).
```
begin
    declare global update_vector ulist_sort[nu] ;
    declare global integer seplist[nu] ;
    declare global integer silist[nu] ;
    ParallelRadixSort(ulist, nu, ulist_sort) ;
    MergeConflict_MarkSeperation(ulist_sort, nu, seplist) ;
```

The parallel merge conflict algorithm
Algorithm MergeConflict (ulist, nu, cfulist) ;

```
    ParallelPrefixScan(seplist, nu, silist) ;
    declare integer nm := silist[nu-1] ;
    declare global integer mergelist[nm] ;
    MergeConflict_StoreSeperation(seplist, silist, nu, mergelist) ;
    MergeConflict_MergeInterval(ulist, nu, mergelist, nm, cfulist) ;
End
```

Parallel Range Query Algorithm

After those conflict-free update vectors are computed for each client commands, we need to update the virtual world by range search, which is the most time-consuming problem overall. From history, we see that the range search problem has been extensively studied for more than twenty years. Many spatial partitioning methods are proposed to accelerate the neighbor search, such as the quad/oct-tree, range tree, R*-tree . . . , etc. Most of them are based on pointer to build up the structure of the tree. However this can hardly be done on current GPU due to the limited instruction set and fixed memory model. Since it requires recursion during tree construction and pair computation, it is not feasible on current GPU even with the CUDA. As a result, we derive our parallel range query algorithm which can be efficiently executed on massively parallel processors with respect to CUDA constraints.

We first assume the visibility range is fixed among all players to simplify the problem, although the limitation can be relaxed by appending a parallel filtering function in the end of the query. Once the range is fixed, we can disperse players into a 2D or 3D grid according to their position in Cartesian space. Grid can be seen as a list of indexed buckets, which is defined as square/cube with edge length equal to the fixed visibility range. This is just the well-known quad/oct-tree data structure. However, since pointer can hardly be implemented and the number of the players in each bucket varies, we cannot store the grid directly on GPU. For example, a straightforward approach is to define the maximum number of players per bucket and reserve all space for every bucket in the grid. Nevertheless, this is a waste in memory, and if the grid size grows larger, GPU will definitely run out of memory in the end because the GPU memory is relatively small to current CPU[1]. To save the memory from wasting while preserving the efficiency of range query on GPU, we re-designed the data representation and search algorithm, which will be explained as follows.

Figure 12:
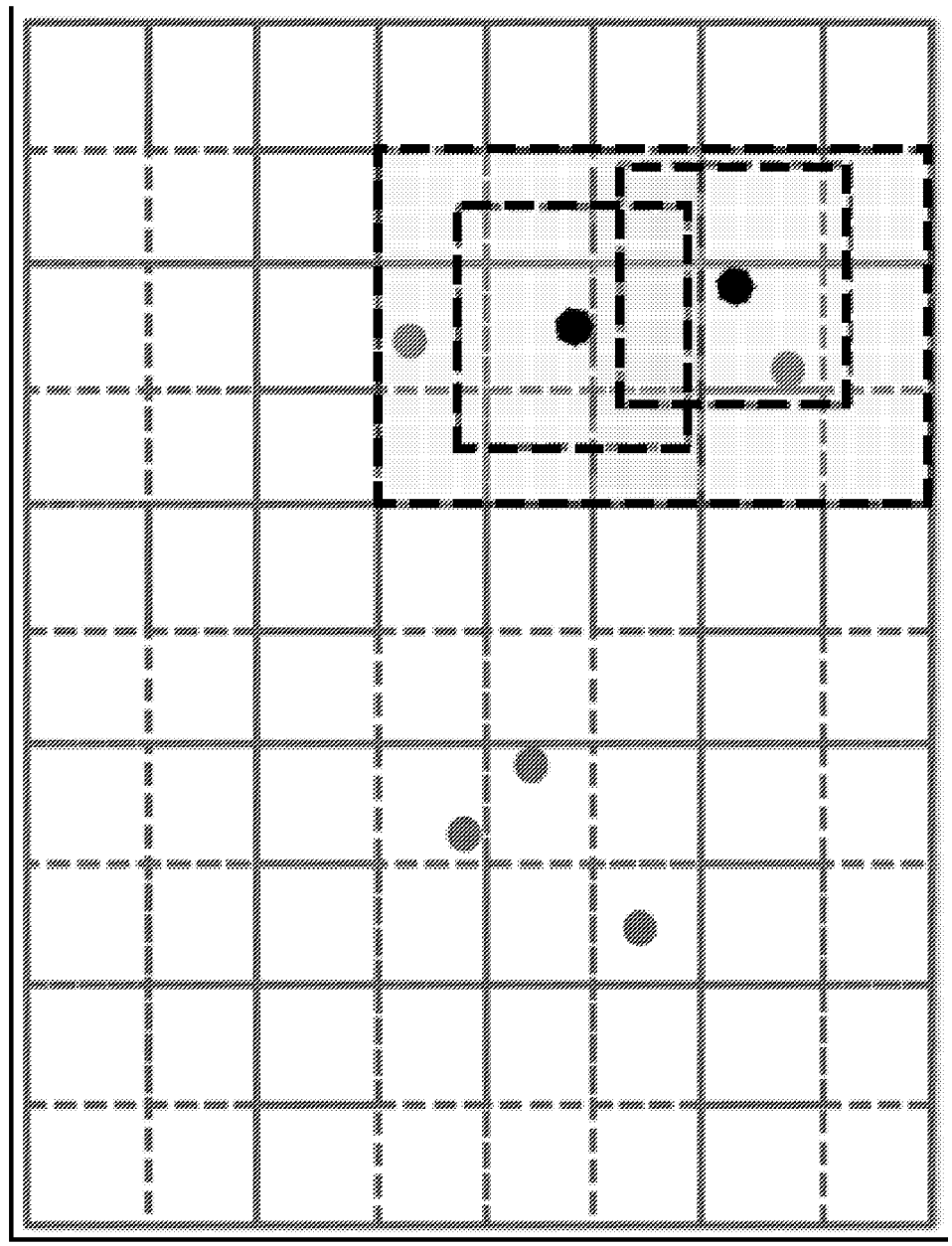
FIG. 12 depicts the multiple update ranges in a grid.

We still rely on the bucket concept in quad/oct-tree to assort all the players. But this time, we store all players' reference in a continuous array sorted by their bucket indices. This can be efficiently done on GPU by parallel load balanced radix sort. Following that representation, we need to perform range query for neighbors of each player whose state is modified by the game logic. We defined bucket as square/cube with edge length equal to the visibility range, and for each update vector, we only need to enumerate all players in adjacent buckets as in FIG. 12. So finally, we have the affected bucket list composed by pairs in the form of {update vector index, bucket index}.

As we stored all players' reference in a continuous way, there are no direct indices can be used to find out who are the players in the specific bucket. Here we employed the parallel binary search to identify the range of specific bucket, that is, we perform binary search for multiple target keys in the same time. Also, to reduce the number of search times, we extract distinct bucket indices from the affected bucket list by the similar way in resolving update conflicts. The algorithms are illustrated as the following sample codes.

---

Write affected bucket indices for the parallel range query algorithm
Algorithm ParallelRangeQuery_WriteAffectedBuckets (plist, np, ulist, nu, blist);

---

Input: ulist (an array of update vectors of size nu).
Output: blist (an array of bucket update vector of size nu).
begin
   declare shared update_vector shm[ ];
   declare integer bs := 256;
   declare integer gs := ceil(nu/bs);
   for bid:=0 to gs−1 do in parallel
     for tid:=0 to bs−1 do in parallel
       declare integer global_tid := bid*bs + tid;
       if global_tid < nu then
         declare update_vector upd := ulist[global_tid];
         declare float2 pos := plist[upd.playerID].position;
         declare int bucket_idx := POSITION_TO_BUCKET_IDX(pos);
         declare integer base := global_tid*9;
         declare bucket_update_vector bupd;
         bupd.updateID := global_tid;
         bupd.bucketID := bucket_idx;
         blist[base+0] := bupd;
         bupd.bucketID := bucket_idx−1;
         blist[base+1] := bupd;
         bupd.bucketID := bucket_idx+1;
         blist[base+2] := bupd;
         bupd.bucketID := bucket_idx−ROW_SIZE;
         blist[base+3] := bupd;
         bupd.bucketID := bucket_idx−ROW_SIZE−1;
         blist[base+4] := bupd;
         bupd.bucketID := bucket_idx−ROW_SIZE+1;
         blist[base+5] := bupd;
         bupd.bucketID := bucket_idx+ROW_SIZE;
         blist[base+6] := bupd;
         bupd.bucketID := bucket_idx+ROW_SIZE−1;
         blist[base+7] := bupd;
         bupd.bucketID := bucket_idx+ROW_SIZE+1;
         blist[base+8] := bupd;
end

---

Mark separation for the parallel range query algorithm
Algorithm ParallelRangeQuery_MarkSeperation (ulist, nu, seplist);

---

Input: ulist (an array of update vectors of size nu).
Output: seplist (an array of indices of size nu).
begin
   declare shared update_vector shm[ ];
   declare integer bs := 256;
   declare integer gs := ceil(nu/bs);
   for bid:=0 to gs−1 do in parallel
     for tid:=0 to bs−1 do in parallel
       declare integer global_tid := bid*bs + tid;
       if global_tid < nr then
         shm[tid] := ulist[tid];
       declare update_vector tl, tr;
       synchronize_threads();
       if global_tid < nu then
         tl := shm[tid];
       synchronize_threads();
       if global_tid < nu && (tid != bs−1 or bid != gs −1) then
         if tid = block_size−1 then
           tr := ulist[global_tid+1];
         else
           tr := shm[tid+1];
         declare integer mark := 0;
         if tl.playerID = tr.playerID && tl.chunkID = tr.chunkID then
           mark := 1;

---

-continued

Mark separation for the parallel range query algorithm
Algorithm ParallelRangeQuery_MarkSeperation (ulist, nu, seplist);

--- synchronize_threads();
         if global_tid < nu then
           seplist[global_tid] := mark;
end

---

Store separation indices for the parallel range query algorithm
Algorithm ParallelRangeQuery_StoreSeperation (seplist, silist, ns, dblist);

---

Input: seplist (an array of size ns containing either 0 or 1 for the mark of separation), silist (an array of indices as memory location references of size ns).
Output: dblist (an array of indices of size nu to store the distinct indices).
begin
   declare integer bs := 256;
   declare integer gs := ceil(nu/bs);
   for bid:=0 to gs−1 do in parallel
     for tid:=0 to bs−1 do in parallel
       declare integer global_tid := bid*bs + tid;
       declare integer mark := 0;
       declare integer reference_address := 0;
       if global_tid < ns then
         mark := seplist[global_tid];
       synchronize_threads();
       if global_tid < ns && mark > 0 then
         reference_address := silist[global_tid];
       synchronize_threads();
       if global_tid < ns && mark > 0 then
         mergelist[reference_address] := global_tid;
end

---

Once we have all needed bucket ranges, we can enumerate all state updates for all adjacent buckets in parallel. Note that before the enumeration, we have to count the number of possible state updates to make sure all updates write to correct memory location in a continuous way. The algorithms are illustrated as the following sample codes:

---

The two-way binary search in the parallel range query algorithm
Algorithm ParallelRangeQuery_BinarySearch (plist_sort, np, dblist, nb, dbilist);

---

Input: plist_sort (a sorted array of player bucket vector of size np), dblist (an array of distinct bucket indices of size nb).
Output: dbrlist (an array of bucket ranges of size nb to store the start/end indices of a specific bucket).
begin
   declare integer bs := 256;
   declare integer gs := ceil(nu/bs);
   for bid:=0 to gs−1 do in parallel
     for tid:=0 to bs−1 do in parallel
       declare integer global_tid := bid*bs + tid;
       if global_tid < nb then
         declare player_bucket pl;
         declare player_bucket pr;
         declare bucket_range range;
         declare integer bucket_idx := dblist[global_tid];
         declare integer rl := np / 2 − 1;
         declare integer rr := np / 2 − 1;
         declare integer level := np / 2;
         declare integer found := 0;
         do
           level := level / 2;
           pl := plist_sort[rl];
           if rl = rr then         pr := pl;
           else         pr :=

The two-way binary search in the parallel range query algorithm
Algorithm ParallelRangeQuery_BinarySearch (plist_sort, np, dblist, nb, dbilist);

```
        plist_sort[rr];
            if pl = bucket_idx or pr = bucket_idx
        then found := 1;
            if pl.bucket <= bucket_idx then rl := rl
+ level;
            else
                rl := rl – level;
            if pr.bucket <= bucket_idx then
                if found = 0 then rr := rr +
level;
            else                            rr := rr
– level;
            else
                if found = 0 then    rr := rr –
level;
            else                            rr := rr
+ level;
        while level > 0
        if pl != bucket_idx then rl := rl + 1;
        if pr != bucket_idx then rr := rr – 1;
        range.left := rl;
        range.right := rr;
        dbrlist[global_tid] := range;
end
```

Count the number of updates for the parallel range query algorithm
Algorithm ParallelRangeQuery_CountUpdates (
blist, nb, ulist, nu, silist, nsi,
dbrlist, ndbr, nclist);

Input: blist (an array of bucket update vector of size nb), ulist (an array of update vectors of size nu), silist (an array of indices for distinct bucket reference of size nsi), dbrlist (an array of bucket ranges of size ndbr).
Output: nclist (an array of size nb to number of update pairs of the bucket update vector).
```
begin
    declare integer bs := 256;
    declare integer gs := ceil(nu/bs);
    for bid:=0 to gs-1 do in parallel
        for tid:=0 to bs-1 do in parallel
            declare integer global_tid := bid*bs + tid;
            if global_tid < nb then
                declare bucket_update_vector bupd :=
blist[global_tid];
                declare update_vector upd :=
ulist[bupd.updateID];
                declare integer si_idx :=
silist[bupd.bucketID];
                declare bucket_range range :=
dbrlist[si_idx];
                nclist[global_tid] := range.right – range.left;
end
```

Enumerate the updates for the parallel range query algorithm
Algorithm ParallelRangeQuery_EnumUpdates (list, nb, ulist, nu,
silist, nsi, dbrlist, ndbr, nclist_scan, nncs, plist,
plist_sort, np, nlist, max_nn);

Input: blist (a array of bucket update vector of size nb), ulist (an array of update vectors of size nu), silist (an array of indices for distinct bucket reference of size nsi), dbrlist (an array of bucket ranges of size ndbr), nclist_scan (an array of scanned indices of uclist of size nncs), plist (an array of player bucket vector of size np), plist_sort (a sorted array of player bucket vector of size np).
Output: nlist (an array of state update vector of maximum size max_nn).

Enumerate the updates for the parallel range query algorithm
Algorithm ParallelRangeQuery_EnumUpdates (list, nb, ulist, nu,
silist, nsi, dbrlist, ndbr, nclist_scan, nncs, plist,
plist_sort, np, nlist, max_nn);

```
begin
    declare integer bs := 256;
    declare integer gs := ceil(nu/bs);
    for bid:=0 to gs-1 do in parallel
        for tid:=0 to bs-1 do in parallel
            declare integer global_tid := bid*bs + tid;
            if global_tid < nb then
                declare bucket_update_vector bupd :=
blist[global_tid];
                declare update_vector upd :=
ulist[bupd.updateID];
                declare integer si_idx :=
silist[bupd.bucketID];
                declare bucket_range range :=
dbrlist[si_idx];
                declare integer base :=
nclist_scan[global_tid];
                declare state_update supd;
                supd.updateInfo := upd;
                for i:=range.left to range.right do
                    supd.playerID := plist[plist_sort[i]];
                    if base+i < max_nn then
                        nnlist[base + i] := supd;
end
```

The parallel range query algorithm
Algorithm ParallelRangeQuery (plist, np, ulist, nu, nlist, max_nn);

Input: plist (an array of player state vectors of size np), rlist (an array of request vectors of size nr).
Output: nlist (an array of notification vectors of maximum size max_nn).
```
begin
    declare global player_state_vector plist_sorted[np];
    declare global bucket_update_vector blist [nu*9];
    declare global bucket_update_vector blist_sorted[nu*9];
    declare global integer seplist[nu*9];
    declare global integer silist[nu*9];
    ParallelRadixSort(plist, np, plist_sorted);
    ParallelRangeQuery_WriteAffectedBuckets(plist, np, ulist, nu, blist);
    ParallelRadixSort(blist, nu*9, blist_sorted);
    ParallelRangeQuery_MarkSeperation(blist_sorted, nu*9, seplist);
    ParallelPrefixScan(seplist, nu*9, silist);
    declare global integer nb := silist[nu*9-1];
    declare global integer dblist[nb];
    declare global bucket_range dbrlist[nb];
    ParallelRangeQuery_StoreSeperation(seplist, silist, nu*9, dblist);
    ParallelRangeQuery_BinarySearch(plist_sorted, np, dblist, nb, dbrlist);
    declare global integer nclist[nu*9];
    declare global integer nclist_scan[nu*9];
    ParallelRangeQuery_CountUpdates(blist_sort, nu*9, ulist, nu,
silist,nu*9,
        dbrlist, nb, nclist);
    ParallelPrefixScan(nclist, nu*9, nclist_scan);
    ParallelRangeQuery_EnumUpdates(blist_sort, nu*9, ulist, nu,
silist, nu*9,   dbrlist, nb, plist_sorted, np, uclist_scan, nu*9, plist,
plist_sort, np, nlist,      max_nn);
end
```

Experimental Setup

We try to evaluate the performance of our GPU MMOG algorithm and compare it with naïve CPU approach to client command processing and updating under a simulated virtual world. Several scenarios with different map size and different AOI (Area-Of-Interest) are simulated on both CPU and GPU. To demonstrate the performance boost and the capability of our GPU algorithms, for each scenario, we vary the number of clients from 512 to 524288 (approx. 0.5M). Suppose each client sends one command to server every one second. Without loss of generality, we assume the inter-arrival time of client commands is uniform. Therefore, for a time span of one second, we expect to receive client commands as many as number of clients.

For each experiment, we evaluate the time for either CPU or GPU to process all client commands that will be arrived within one second to see if it is capable of handling given number of clients. Each setting is ran and analyzed for 100 times for average time to process all client commands and standard deviation of it. Apparently, if the average time to process all client commands is greater than one second, we can say that the setting will leads to server crash, since the server will have infinite number of client commands waiting to process in the end.

Hardware and Software Configuration

To support CUDA computing, we have the following hardware configuration:

| | |
|---|---|
| CPU | Intel Core 2 Duo E6300 (1.83 GHz, dual-core) |
| Motherboard | ASUS Striker Extreme, NVIDIA 680SLi Chipset |
| RAM | Transcand 2G DDR-800 |
| GPU | NVIDIA 8800GTX 768 MB (MSI OEM) |
| HDD | WD 320G w/ 8 MB buffer |

Since we want to compare the performance of CPU versus GPU, we list the specification of the GPU and software configuration in details as followings:

| | |
|---|---|
| Code Name | GeForce 8800 GTX (G80) |
| Number of SIMD Processor | 16 |
| Number of Registers | 8192 (per SIMD processor) |
| Constant Cache | 8 KB (per SIMD processor) |
| Texture Cache | 8 KB (per SIMD processor) |
| Processor Clock Frequency | Shader: 1.35 GHz, Core: 575 MHz |
| Memory Clock Frequency | 900 MHz |
| Shared Memory Size | 16 KB (per SIMD processor) |
| Device Memory Size | 768 MB GDDR3 |
| OS | Windows XP w/Service Pack 2 (32 bit version) |
| GPU Driver Version | 97.73 |
| CUDA Version | 0.81 |
| Visual C++ Runtime | MS VC8 CRT ver. 8.0.50727.762 |

For the moment of this writing, CUDA is just released in public only for 3 months. There are still lots of bugs in the toolkit and the runtime library. For example, as you will see later, the data transfer between host memory (i.e. CPU memory) and the device memory (i.e. GPU memory) is somewhat slow due to the buggy runtime library. Also, even if the algorithm is carefully coded with regard to CUDA architecture, several compiler bugs lead to poor performance for the sake of non-coalesced memory access. Fortunately, those bugs are promised to be fixed in the next release of CUDA.

For client command processing simulation on CPU, we make use of STL to implement grid-based world container. Each bucket in the grid is a list of variable length to store client objects. We choose to create a single thread to perform the entire simulation but multiple threads because we want to make it simple without inter-thread communication overhead.

Evaluation and Analysis

We choose four different scenarios to find out the differences between CPU and GPU in terms of performances. The selected scenarios are listed as the following:

| | Map Size | | | |
|---|---|---|---|---|
| | 2500 × 2500 | | 5000 × 5000 | |
| AOI | 10 × 10 | 20 × 20 | 10 × 10 | 20 × 20 |
| Client Count | | 512~524288 | | |

All scenarios are evaluated and the result is summarized as the following two tables.

| Average Execution Time | | | | |
|---|---|---|---|---|
| | MAP = 2500 × 2500, AOI = 10 × 10 | | MAP = 2500 × 2500, AOI = 20 × 20 | |
| | CPU | GPU | CPU | GPU |
| 512 | 2.303 | 9.299 | 5.425 | 9.348 |
| 1024 | 4.624 | 10.529 | 10.869 | 10.602 |
| 2048 | 9.259 | 12.255 | 21.804 | 12.828 |
| 4096 | 18.711 | 14.296 | 43.871 | 16.082 |
| 8192 | 37.954 | 19.628 | 89.346 | 26.174 |
| 16384 | 77.139 | 34.020 | 184.965 | 59.245 |
| 32768 | 160.524 | 78.416 | 393.089 | 180.017 |
| 65536 | 346.258 | 226.567 | 872.226 | 655.178 |
| 131072 | 787.703 | 769.591 | 2020.357 | 2593.582 |
| 262144 | 1917.623 | 2903.820 | 5015.093 | 10695.969 |
| 524288 | 4982.445 | 11562.311 | INVALID | INVALID |

Average Execution Time for map size 2500×2500

| Average Execution Time | | | | |
|---|---|---|---|---|
| | MAP = 5000 × 5000, AOI = 10 × 10 | | MAP = 5000 × 5000, AOI = 20 × 20 | |
| | CPU | GPU | CPU | GPU |
| 512 | 2.551 | 9.271 | 5.872 | 9.299 |
| 1024 | 5.094 | 10.450 | 11.717 | 10.503 |
| 2048 | 10.177 | 12.429 | 23.392 | 12.335 |
| 4096 | 20.408 | 14.028 | 47.006 | 14.405 |
| 8192 | 40.924 | 17.781 | 94.659 | 19.602 |
| 16384 | 82.299 | 26.537 | 190.806 | 33.853 |
| 32768 | 166.343 | 48.732 | 388.601 | 78.061 |
| 65536 | 339.565 | 112.016 | 804.078 | 226.177 |
| 131072 | 706.888 | 307.877 | 1707.657 | 766.990 |
| 262144 | 1520.068 | 963.912 | 3780.537 | 2897.588 |
| 524288 | 3421.073 | 3374.011 | 8741.187 | 11540.627 |

Average Execution Time for map size 5000×5000

Figure 13:
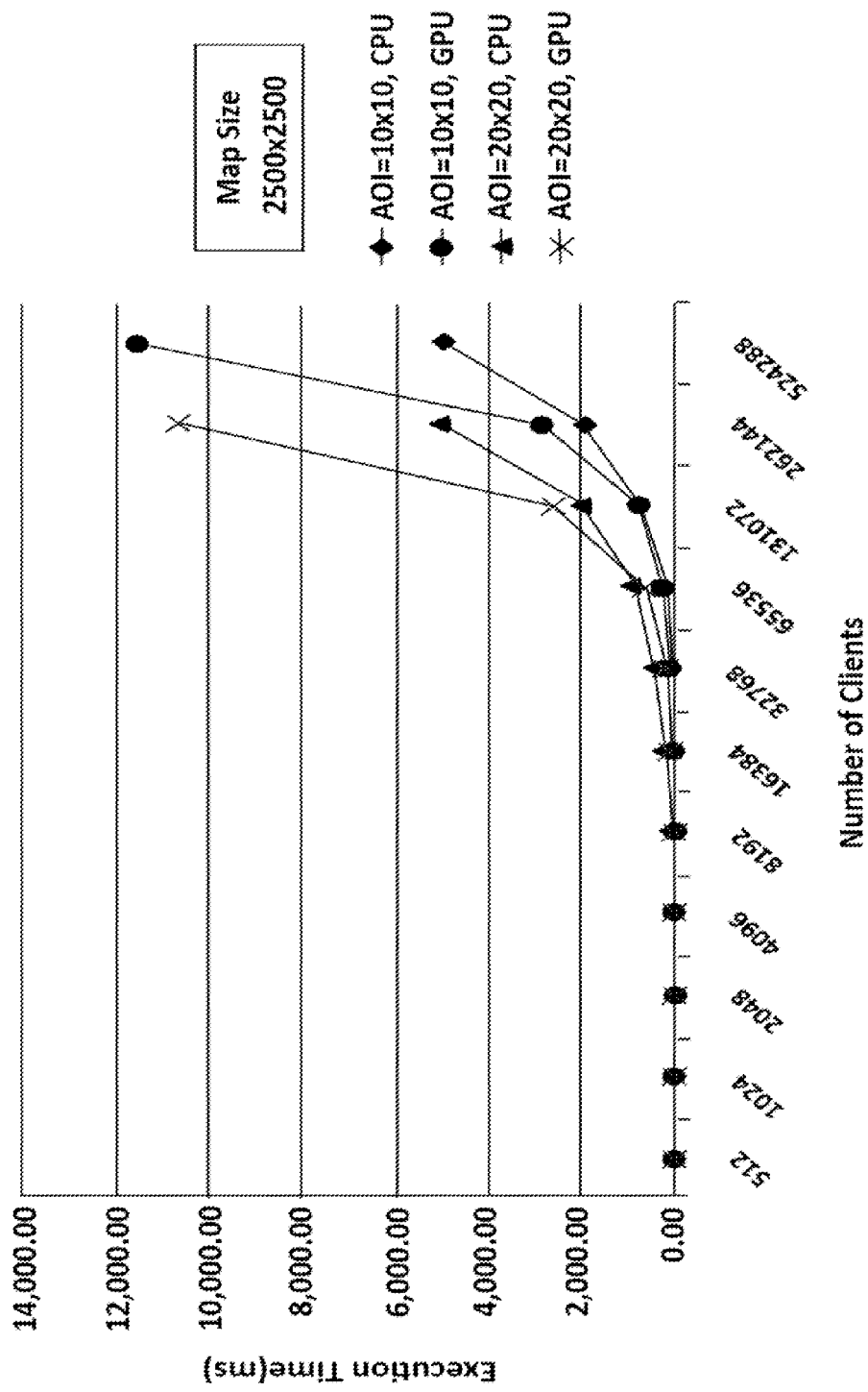
FIG. 13 depicts the average execution time for map size 2500×2500.
Figure 14:
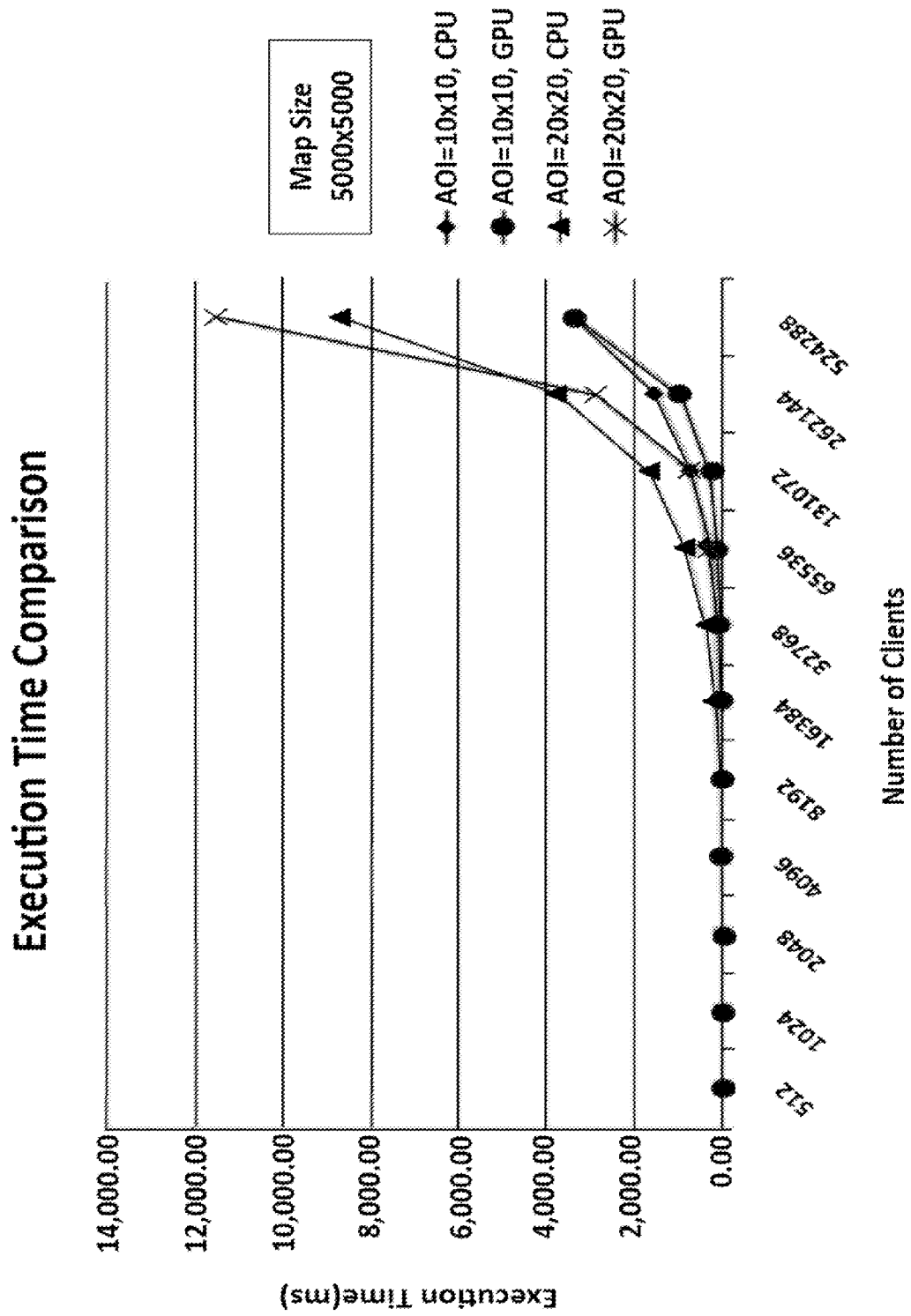
FIG. 14 depicts the average execution time for map size 5000×5000.
Figure 15:
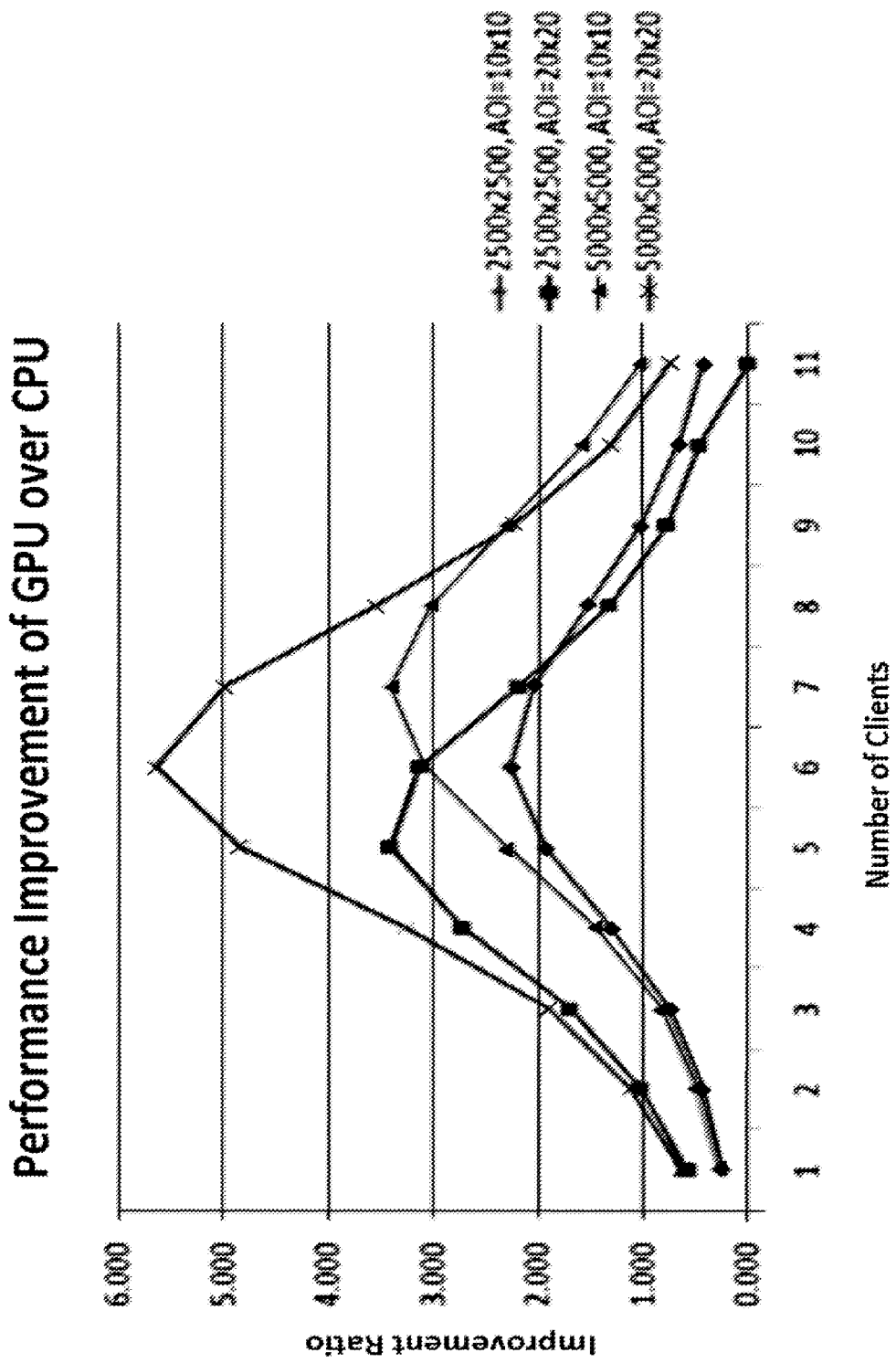
FIG. 15 depicts a diagram illustrating the performance improvement ratio of GPU over CPU

The performance boost of GPU over CPU is calculated and depicted in following table and FIG. 13-15. The reason that some test case is marked as invalid in the table is that there are too many updates generated so that GPU cannot handle it due to limited memory resources.

| Performance Improvement Ratio | | | | |
|---|---|---|---|---|
| | 2500 × 2500 AOI = 10 × 10 | 2500 × 2500 AOI = 20 × 20 | 5000 × 5000 AOI = 10 × 10 | 5000 × 5000 AOI = 20 × 20 |
| 512 | 0.248 | 0.580 | 0.275 | 0.632 |
| 1024 | 0.439 | 1.025 | 0.487 | 1.116 |
| 2048 | 0.756 | 1.700 | 0.819 | 1.896 |
| 4096 | 1.309 | 2.728 | 1.455 | 3.263 |
| 8192 | 1.934 | 3.414 | 2.302 | 4.829 |
| 16384 | 2.267 | 3.122 | 3.101 | 5.636 |
| 32768 | 2.047 | 2.184 | 3.413 | 4.978 |
| 65536 | 1.528 | 1.331 | 3.031 | 3.555 |
| 131072 | 1.024 | 0.779 | 2.296 | 2.226 |
| 262144 | 0.660 | 0.469 | 1.577 | 1.305 |
| 524288 | 0.431 | INVALID | 1.014 | 0.757 |

Performance Improvement Ratio of GPU over CPU

From FIG. 27, we can see the performance improvement by a factor of 5.6 when the number of client is 16384 in a virtual world of size 5000×5000, AOI=20×20. This result is not as good as what we expect to see, however, as GPU comes with 128 ALUs in total, and the GPU memory bandwidth is 30 times faster than CPU.

From our measure, when the number of clients is smaller than 4096, the CPU gives better performance than GPU because the GPU is designed for large number of data set, so it is not fully utilized. However, when the number of client is bigger than 131072 in the 2500×2500 map, CPU again outperforms GPU again. We observe that the reason that GPU fails to give unparallel performance is the limited bandwidth between CPU and GPU inherited from the buggy CUDA runtime.

Detail Performance of GPU

Recall that our GPU algorithm performs the server execution in four steps:
1. Upload data to GPU: CPU collect client commands and compile them into an array of data and upload to GPU via PCI-Express bus.
2. Generate/sort client bucket: before processing client commands, client bucket indices are generated and all client objects are sorted into bucket indices. This is used to perform parallel range queries.
3. Process client commands and enumerate updates: count and store the game logics, and generate a list of conflict-free update vectors. Based on sorted client object list, we perform parallel range queries and write the affected neighbor list, and finally update the virtual world.
4. Download the update vectors back to CPU: download all update vectors and affected neighbor list from GPU to CPU.

Among the four steps, the last step is actually extremely time-consuming due to a well-known CUDA bug, that is, memory transfer from GPU to CPU is somewhat slow (roughly about only 1/10 bandwidth only). Also, from our experiences with CUDA and the observed performance of our algorithms, the well-written CUDA program can outperform those poorly-written ones by a factor of 100. For example, our load-balanced parallel radix sort is poorly implemented, resulting in a very slow sorting performance.

The following table summarizes the time spent at each step of our GPU algorithm for the 2500×2500, AOI=10×10 scenario. Obviously, the time to download update vectors from GPU back to CPU takes more than 95% of the entire execution in the extreme case. While the CPU and GPU are interconnected via the PCI-Express x16 bus, which theoretically delivers more than 4 GB/s bandwidth to main memory, the result is not reasonable and generally regarded as a CUDA bug in current release. Since there is no asynchronous readback in the current CUDA release, we cannot resolve the issue currently.

| Detailed Execution Time of GPU Algorithm | | | | |
|---|---|---|---|---|
| | Upload | Bucket Sorting | Logic Processing | Download |
| 512 | 0.025 | 5.198 | 3.991 | 0.085 |
| 1024 | 0.033 | 5.291 | 5.028 | 0.177 |
| 2048 | 0.046 | 5.480 | 6.341 | 0.388 |
| 4096 | 0.070 | 5.933 | 7.193 | 1.099 |
| 8192 | 0.128 | 6.885 | 9.228 | 3.388 |
| 16384 | 0.235 | 8.770 | 12.801 | 12.215 |
| 32768 | 0.387 | 12.845 | 20.762 | 44.422 |
| 65536 | 0.688 | 21.738 | 37.891 | 166.249 |
| 131072 | 1.323 | 39.133 | 76.725 | 652.409 |
| 262144 | 2.556 | 72.936 | 168.346 | 2659.982 |
| 524288 | 5.053 | 137.026 | 413.857 | 11006.376 |

Detailed Execution Time of GPU Algorithm at Each Step

Based on different design methodology in the virtual world representation, we observe some differences between the grid-based approach and the GPU-based approach. For grid-based approach, we simply make a large array with each element as a variable-length linked-list. Client objects are stored in the list and are searched in a sequential way for each update. For GPU-based approach, recall that we don't have a grid on GPU memory, but instead, we sort the client objects according to their bucket indices and then perform N-way binary search to find affected neighbors. Apparently, the performance of grid-based approach is dominated by the average number of clients in the area of interest and the size of area of interest. The larger the size of AOI is, the more cells in the grid needed to be traversed are. However, the change of AOI does not change the behavior of GPU-based approach, and we will have same performance if the average number of clients in AOI remains the same. From Fig, CPU performance loss are observed when the configuration changes from 2500×2500 with AOI=10×10 to 5000×5000 with AOI=20×20, while the GPU performances in the two configuration are almost identical.

While the invention has been described in terms of what is presently considered to be the most practical and preferred embodiment, it should be understood that the invention needs not to be limited to the above embodiment. On the contrary, it is intended to cover various modification and similar arrangement included within the spirit and scope of the appended claims which are to be accorded with the broadest interpretation so as to encompass all such modification and similar structures.

What is claimed is:

1. A method for simulating a virtual world by utilizing a parallel co-processor with a dedicated memory, comprising:
   performing a parallel logic processing by said parallel co-processor, wherein said performing said parallel logic processing comprises:
   performing a count phase, wherein said performing said counting phase comprises:
   determining a first plurality of update counts for a plurality of threads in a counting phase by said parallel co-processor;
   storing said first plurality of update counts into said dedicated memory; and
   allocating a memory block from said dedicated memory according to said first plurality of update counts for storing a plurality of update vectors without any memory conflict;

performing a storing phase, wherein said performing said storing phase comprises:
writing updates into said memory block;

performing a parallel conflict merge by said parallel co-processor, wherein said performing said parallel conflict merge comprises:
generating a sorted list from said first plurality of update vectors;
generating a first separation list from said sorted list;
generating a first store indices list;
generating a merge list based on said first separation list and said first store indices list; and
performing parallel merge based on said merge list;

performing a parallel range query by said parallel co-processor, wherein said performing said parallel range query comprises:
calculating a plurality of affected buckets based on a second plurality of update vectors, wherein said virtual world is divided into a plurality of buckets, each bucket is a square or a cube with an edge length equal to a visibility range, and each of said plurality of affected buckets is within said visibility range from any of said second plurality of update vectors;
generating a second separation list from said plurality of affected buckets;
generating a second store indices list;
determining a second plurality of update counts based on said plurality of affected buckets;
allocating a second memory block from said dedicated memory according to said second plurality of update counts for storing said plurality of affected buckets.

2. The method for simulating the virtual world as claimed in claim 1, wherein said parallel co-processor is a graphic processing unit.

3. The method for simulating the virtual world as claimed in claim 1, wherein said parallel co-processor is a field-programmable gate array (FPGA).

4. The method for simulating the virtual world as claimed in claim 1, wherein said virtual world is a computer based real-time simulated environment where a first virtual world object interacts with a second virtual world object.

5. The method for simulating the virtual world as claimed in claim 1, wherein said virtual world is a Massive Multi-player On-Line Game (MMOG).

6. The method for simulating the virtual world as claimed in claim 1, wherein said generating said first separation list in performing parallel conflict merge further comprises comparing two adjacent elements in said sorted list.

7. The method for simulating the virtual world as claimed in claim 1, wherein said allocating said first memory block from said dedicated memory further comprises:
performing a parallel prefix sum on said first plurality of update counts to determine a storage requirement for storing a plurality of update vectors by said parallel co-processor; and
allocating said first memory block according to said storage requirement.

8. The method for simulating the virtual world as claimed in claim 1, wherein said first plurality of update vectors is identical to said second plurality of update vector.

9. The method for simulating the virtual world as claimed in claim 1, wherein before calculating said plurality of affected buckets based said second plurality of update vectors, the method further comprises performing a parallel sort on attributes of a plurality of virtual world objects, which are targeted to be updated.

10. The method for simulating the virtual world as claimed in claim 1, wherein after calculating said plurality of affected buckets based said second plurality of update vectors, the method further comprises performing a parallel sort on attributes of a plurality of virtual world objects, which are targeted to be updated.

11. The method for simulating the virtual world as claimed in claim 1, wherein said performing a parallel conflict merge by said parallel co-processor further comprises:
generating said first store indices list by performing a parallel prefix sum on said first separation list.

* * * * *